United States Patent
Thomas et al.

(10) Patent No.: US 7,895,460 B2
(45) Date of Patent: Feb. 22, 2011

(54) SERIALLY CONNECTED PROCESSING ELEMENTS HAVING FORWARD AND REVERSE PROCESSING TIME INTERVALS

(75) Inventors: Terence Neil Thomas, Ottawa (CA); Stephen J. Davis, Nepean (CA)

(73) Assignee: SAtech Group, A.B. Limited Liability Company, Wilimington, DE (US)

( * ) Notice: Subject to any disclaimer, the term of this patent is extended or adjusted under 35 U.S.C. 154(b) by 0 days.

(21) Appl. No.: 12/885,352

(22) Filed: Sep. 17, 2010

(65) Prior Publication Data
US 2011/0010564 A1    Jan. 13, 2011

Related U.S. Application Data

(60) Division of application No. 12/111,138, filed on Apr. 28, 2008, now Pat. No. 7,814,244, which is a continuation of application No. 11/327,725, filed on Jan. 6, 2006, now Pat. No. 7,694,045, which is a continuation of application No. 09/851,169, filed on May 9, 2001, now Pat. No. 7,017,064.

(51) Int. Cl.
*G06F 1/12* (2006.01)
(52) U.S. Cl. ............... 713/400; 710/58; 713/401; 713/501; 713/502; 713/503; 713/601
(58) Field of Classification Search ............... None
See application file for complete search history.

(56) References Cited

U.S. PATENT DOCUMENTS

| 4,200,770 A | 4/1980 | Hellman et al. |
| 4,797,848 A | 1/1989 | Walby |
| 4,851,995 A | 7/1989 | Hsu et al. |
| 4,873,456 A | 10/1989 | Olisar et al. |
| 4,949,249 A | 8/1990 | Lefsky et al. |
| 5,001,661 A | 3/1991 | Corleto et al. |
| 5,101,431 A | 3/1992 | Even |
| 5,117,490 A | 5/1992 | Duxbury et al. |

(Continued)

FOREIGN PATENT DOCUMENTS

JP          0301 7891 A     1/1991

OTHER PUBLICATIONS

Bajard, J. et al., "An RNS Montogomery modular multiplication algorithm," IEEE Transactions on Computers, 47 (7):766-776 (1998).

(Continued)

*Primary Examiner*—Alan Chen

(57) ABSTRACT

Methods and apparatus provide a delayed clock signal to a plurality of serially connected processing elements, such as a bidirectional pipeline processor. The processing elements include forward and reverse processing paths and forward and reverse processing time intervals along the respective paths. The forward and reverse processing time intervals begin when a block of data, such as encryption data, is gated into an individual processing element for processing and terminate when the processed block of data is gated into a subsequent adjacent processing element along the respective forward or reverse processing path. A clock signal distribution circuit provides a clock signal to the plurality of processing elements such that the clock signal arrives at successive processing elements along the clock signal distribution circuit with an increasing amount of delay so that one of the forward or reverse processing time intervals is greater than the other.

20 Claims, 18 Drawing Sheets

U.S. PATENT DOCUMENTS

| | | |
|---|---|---|
| 5,144,667 A | 9/1992 | Pogue, Jr. et al. |
| 5,210,710 A | 5/1993 | Omura |
| 5,313,530 A | 5/1994 | Iwamura |
| 5,321,752 A | 6/1994 | Iwamura et al. |
| 5,398,262 A | 3/1995 | Ahuja |
| 5,398,284 A | 3/1995 | Koopman, Jr. et al. |
| 5,414,651 A | 5/1995 | Kessels |
| 5,481,573 A | 1/1996 | Jacobowitz et al. |
| 5,486,783 A | 1/1996 | Baumert et al. |
| 5,499,299 A | 3/1996 | Takenaka et al. |
| 5,513,133 A | 4/1996 | Gressel et al. |
| 5,572,690 A | 11/1996 | Molnar et al. |
| 5,572,714 A | 11/1996 | Nakakura |
| 5,586,307 A | 12/1996 | Wong et al. |
| 5,600,720 A | 2/1997 | Iwamura et al. |
| 5,623,683 A | 4/1997 | Pandya |
| 5,666,419 A | 9/1997 | Yamamoto et al. |
| 5,724,280 A | 3/1998 | Davis |
| 5,742,530 A | 4/1998 | Gressel et al. |
| 5,764,083 A | 6/1998 | Nguyen et al. |
| 5,828,870 A | 10/1998 | Gunadisastra |
| 5,848,159 A | 12/1998 | Collins et al. |
| 5,859,595 A | 1/1999 | Yost |
| 5,867,412 A | 2/1999 | Suh |
| 5,867,448 A | 2/1999 | Mann |
| 5,907,685 A | 5/1999 | Douceur |
| 5,923,871 A | 7/1999 | Gorshtein et al. |
| 5,982,900 A | 11/1999 | Ebihara et al. |
| 5,987,489 A | 11/1999 | Monier |
| 6,005,428 A | 12/1999 | Amdahl |
| 6,026,421 A | 2/2000 | Sabin et al. |
| 6,069,887 A | 5/2000 | Geiger et al. |
| 6,088,254 A | 7/2000 | Kermani |
| 6,088,453 A | 7/2000 | Shimbo |
| 6,088,800 A | 7/2000 | Jones et al. |
| 6,122,751 A | 9/2000 | Janssens et al. |
| 6,144,743 A | 11/2000 | Yamada et al. |
| 6,151,393 A | 11/2000 | Jeong |
| 6,182,233 B1 | 1/2001 | Schuster et al. |
| 6,420,663 B1 | 7/2002 | Zelikson et al. |
| 6,484,193 B1 | 11/2002 | Choe et al. |
| 6,618,816 B1 | 9/2003 | Ido et al. |
| 6,633,995 B1 | 10/2003 | Nam |
| 7,017,064 B2 | 3/2006 | Thomas et al. |
| 7,694,045 B2 | 4/2010 | Thomas et al. |
| 7,814,244 B2 | 10/2010 | Thomas et al. |

OTHER PUBLICATIONS

Blum T., "Modular Exponentiation on Reconfigurable Hardware", Thesis, Apr. 8, 1999, The Worcester Polytechnic Institute, Worcester.

Brickell, E.F. et al., "A survey of hardware implementations of RSA," Advances in Cryptology-CRYPTO '89, 368-370, Spinger-Verlag (1990).

Eldridge, S.E. et al., "Hardware implementation of Montgomery's modular multiplication algorithm," IEEE Transactions on Computers, 42(6):693-699 (1993).

Heshami, Nehrdad et al., "A 250-MHZ Skewed-Clock Pipelined Data Buffer," IEEE Journal of Solid-State Circuits, 31(3):376-383 (1996).

International Search Report for International Patent Application No. PCT/CA2002/000656, dated Jun. 24, 2004, 6 pages.

Jeong, Yong-Yin et al., "VLSI array algorithms and architectures for RSA modular multiplication," IEEE Transactions on VLSI Systems, 5(2):211-17 (1997).

Montgomery, P.L., "Modular multiplication without trial division," Mathematics of Computation, 44(170):519-521 (1985).

Orup, H., "Simplifying quotient determination in high-radix modular multiplication," Proceedings 12th Symposium on Computer arithmetic, 193-199 (1995).

Shand et al., "Fast implementations of RSA cryptography," Proceedings 11th IEEE Symposium on Computer Arithmetic, 252-259 (1993).

Takagai, N., "A radix-4 modular multiplication hardware algorithm efficient for iterative modular multiplication operations," Proceedings 10th IEEE Symposium on Computer Arirthmetic, 35-42 (1991).

Vuillemin J.E., et al., "Programmable active memories: Reconfigurable systems come of age," IEEE Transactions on VLSI Systems, 4(1):56-69 (1996).

Wang, P.A., "New VLSI architectures of RSA public key crypto systems," Proceedings of 1997 IEEE International Symposium on Circuits and Systems, vol. 3, 2040-2043 (1997).

TIME →

SERIALLY CONNECTED PROCESSING ELEMENTS HAVING FORWARD AND REVERSE PROCESSING TIME INTERVALS

RELATED APPLICATIONS

This application is a divisional of and claims priority to U.S. application Ser. No. 12/111,138, filed Apr. 28, 2008, which is a continuation of U.S. application Ser. No. 11/327,725, filed Jan. 6, 2006, now U.S. Pat. No. 7,694,045, issued Apr. 6, 2010, which is a continuation of U.S. application Ser. No. 09/851,169, filed May 9, 2001, now U.S. Pat. No. 7,017,064, issued Mar. 21, 2006. The entire teachings of each of the above applications are incorporated herein by reference.

TECHNICAL FIELD

This disclosure relates to a clock distribution circuit for use with an apparatus having a large number of stages in what is often referred to as a pipeline arrangement.

BACKGROUND

It is becoming relatively common to exchange electronically stored documents between parties to a transaction, for instance via a widely distributed information network such as the Internet of the World Wide Web (WWW). A common problem with the Internet is a lack of secure communication channels. Thus, in order for hospitals, governments, banks, stockbrokers, and credit card companies to make use of the Internet, privacy and security must be ensured. One approach to solving the aforementioned problem uses data encryption prior to transmission. In a prior art system, a host computer system is provided with an encryption unit, for example an encryption processor that is in electrical communication with at least a memory circuit for storing at least a private encryption key. When information is to be transmitted from the host computer system to a recipient via the Internet and is of a confidential nature, the information is first passed to the encryption processor for encryption using the stored private key. Typically, a same private key is used every time a data encryption operation is performed. Alternatively, an encryption key is selected from a finite set of private encryption keys that is stored in the at least a memory circuit in electrical communication with the encryption processor.

Of course, a data encryption operation that is performed by an encryption processor is a mathematical algorithm in which an input data value, for instance a hashed version of an electronic document, is the only variable value. It is, therefore, possible to optimize the encryption processor to perform a desired encryption function using a least amount of processor resources. Additionally, in the prior art encryption units the optimized encryption processor is typically separate from the microprocessor of the host computer system, because it is best optimized in this way.

Several standards exist today for privacy and strong authentication on the Internet through encryption/decryption. Typically, encryption/decryption is performed based on algorithms which are intended to allow data transfer over an open channel between parties while maintaining the privacy of the message contents. This is accomplished by encrypting the data using an encryption key by the sender and decrypting it using a decryption key by the receiver. In symmetric key cryptography, the encryption and decryption keys are the same. Encryption algorithms are typically classified into public-key and secret key algorithms. In secret-key algorithms, keys are secret whereas in public-key algorithms, one of the keys is known to the general public. Block ciphers are representative of the secret-key cryptosystems in use today. Usually, for block ciphers, symmetric keys are used. A block cipher takes a block of data, typically 32-128 bits, as input data and produces the same number of bits as output data. The encryption and decryption operations are performed using the key, having a length typically in the range of 56-128 bits. The encryption algorithm is designed such that it is very difficult to decrypt a message without knowing the key.

In addition to block ciphers, Internet security protocols also rely on public-key based algorithms. A public key cryptosystem such as the Rivest, Shamir, Adelman (RSA) cryptosystem described in U.S. Pat. No. 5,144,667 issued to Pogue and Rivest uses two keys, one of which is secret—private—and the other of which is publicly available. Once someone publishes a public key, anyone may send that person a secret message encrypted using that public key; however, decryption of the message can only be accomplished by use of the private key. The advantage of such public-key encryption is private keys are not distributed to all parties of a conversation beforehand. In contrast, when symmetric encryption is used, multiple secret keys are generated, one for each party intended to receive a message, and each secret key is privately communicated. Attempting to distribute secret keys in a secure fashion results in a similar problem as that faced in sending the message using only secret-key encryption; this is typically referred to as the key distribution problem.

Key exchange is another application of public-key techniques. In a key exchange protocol, two parties can agree on a secret key even if their conversation is intercepted by a third party. The Diffie-Hellman exponential key exchange method, described in U.S. Pat. No. 4,200,770, is an example of such a protocol.

Most public-key algorithms, such as RSA and Diffie-Hellman key exchange, are based on modular exponentiation, which is the computation of $\alpha^x \bmod p$. This expression means "multiply a by itself x times, divide the answer by p, and take the remainder." This is very computationally expensive to perform, for the following reason. In order to perform this operation, many repeated multiplication operations and division operations are required. Techniques such as Montgomery's method, described in "Modular Multiplication Without Trial Division," from Mathematics of Computation, Vol. 44, No. 170 of April 1985, can reduce the number of division operations required but do not overcome this overall computational expense. In addition, for present day encryption systems the numbers used are very large (typically 1024 bits or more), so the multiply and divide instructions found in common CPUs cannot be used directly. Instead, special algorithms that break down the large multiplication operations and division operations into operations small enough to be performed on a CPU are used. These algorithms usually have a run time proportional to the square of the number of machine words involved. These factors result in multiplication of large numbers being a very slow operation. For example, a Pentium® processor can perform a 32×32-bit multiply in 10 clock cycles. A 2048-bit number can be represented in 64 32-bit words. A 2048×2048-bit multiply requires 64×64 separate 32×32-bit multiplication operations, which takes 40960 clocks on the Pentium® processor. An exponentiation with a 2048-bit exponent requires up to 4096 multiplication operations if done in the straightforward fashion, which requires about 167 million clock cycles. If the Pentium processor is running at 166 MHZ, the entire operation requires roughly one second. Of course, the division operations add further time to the overall computation times.

Clearly, a common CPU such as a Pentium cannot expect to do key generation and exchange at any great rate.

Pipeline processors comprising a plurality of separate processing elements arranged in a serial array, and in particular a large number of processing elements, are known in the prior art and are particularly well suited for executing data encryption algorithms. Two types of pipeline processor are known: processors of an in-one-end-and-out-the-other nature, wherein there is a single processing direction; and, bidirectional processors of an in-and-out-the-same-end nature, wherein there is a forward processing direction and a return processing direction. Considering a specific example of a bi-directional pipeline processor, a first data block is read from a memory buffer into a first processing element of the serial array, which element performs a first stage of processing and then passes the first data block on to a second processing element. The second processing element performs a second stage of processing while, in parallel, the first processing element reads a second data block from the memory buffer and performs a same first processing stage on the second data block. In turn, each data block propagates in a step-by-step fashion from one processing element to a next processing element along the forward processing direction of the serial array. At each step, there is a processing stage that performs a same mathematical operation on each data block that is provided thereto. Simultaneously, a result that is calculated at each processing element is provided to a previous processing element of the serial array, with respect to the return processing direction, which results comprise in aggregate the processed data returned by the encryption processor. This assembly-line approach to data processing, using a large number of processing elements, is a very efficient way of performing the computationally expensive data encryption algorithms described previously. Of course, the application of pipeline processors for performing computationally expensive processing operations is other than limited strictly to data encryption algorithms, which have been discussed in detail only by way of example.

It is a disadvantage of the prior art bi-directional pipeline processors that each processing element of a serial array must be time-synchronized with every other processing element of a same serial array. Time-synchronization between processing elements is necessary for the control of timing the gating of data blocks from one processor element to a next processor element in the forward direction, and for timing the gating of processed data from one processor element to a previous processor element in the return direction. A clock typically controls the progression of data blocks along the pipeline in each one of the forward direction and the return direction. Unfortunately without careful clock distribution design, as a clock signal progresses along the pipeline there are incremental delays between each stage, as for example delays caused by the resistance and capacitance that is inherent in the clock circuit. In earlier, slower acting pipeline processors, such delays were not important, and did not adversely affect the overall operation, or calculation. With faster operation, these delays are becoming significant, requiring more accurate and precise clock distribution methods.

Further, in order to read data from a memory buffer, for example data for processing by the pipeline processor, the first processing stage in the serial array must also be time-synchronized with the memory buffer. This further encourages synchronous clock distribution within a pipeline processor.

It would be advantageous to provide a system and a method for processing data using a pipeline processor absent a need to synchronize a distributed clock value that is provided to each processing element of the pipeline processor. Such a system would be easily implemented using a relatively simple circuit design, in which large blocks of processor elements are fabricated from a series of processor element sub-units.

DETAILED DESCRIPTION

Figure 1:
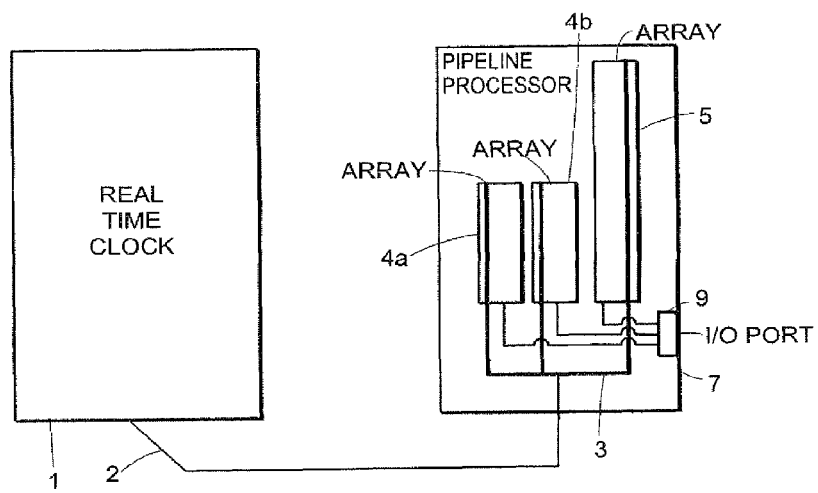
FIG. 1 shows a simplified block diagram of a pipeline processor, according to one embodiment.

With reference to the above-listed drawings, this section describes particular embodiments and their detailed construction and operation.

According to one embodiment, a clock conductor is positioned in the proximity of the various stages, as by snaking the conductor alongside the stages, so that time delays between stages can be reduced. Thus the clock delay is now substantially small between adjacent elements without a need for proper inter-element synchronization. A further advantage is realized when a consistent time delay is provided between adjacent elements in that interconnection between stages other than those immediately adjacent is possible.

A further advantage is that, if desired, instead of the entire array of stages being used for a large calculation, the array can be subdivided, for example into halves or quarters, such that more than one calculation is carried out at a same time.

Preferably, various embodiments provide a pipeline processor absent a synchronous clock signal for all processing elements.

Certain embodiments provide a calculating apparatus having a plurality of stages in an extended pipeline array, arranged in a series of side-by-side subarrays, and a clock conductor extending in a sinuous form alongside the array, connected to each stage. The array can be in the form of sections, each having input and output access whereby the whole array or sections of the array can process data. The apparatus has forward and return paths and can be arranged so that the shortest calculation taking place in a stage is arranged to take place in the return path.

In accordance with another embodiment, there is provided an apparatus for processing data comprising:

a plurality of individual processing elements arranged in a serial array wherein a first processing element precedes a second processing element which precedes an nth processing element; and, a clock distribution circuit in electrical communication with each processing element of the plurality of individual processing elements in the serial array such that, in use, a clock signal propagated along the clock distribution circuit arrives at each processing element delayed relative to the clock signal arriving at a preceding processing element;

wherein a time equal to an exact number of clock cycles, k, where k is greater than zero, from when the data is clocked into a processing element to when the data is clocked in by a subsequent processing element is insufficient for providing accurate output data from the processing element but wherein the same time with the additional delay is sufficient and wherein new data to be processed is clocked in by the 20 same processing element after the exact number of clock cycles, k.

In accordance with yet another embodiment, there is provided a switchable processing element comprising:

a first port for receiving a first clock signal;

a second port for receiving a second other clock signal;

a switch operable between two modes for selecting one of the first clock signal and the second other clock signal; and wherein the selected one of the first clock signal and the second other clock signal is provided to the processing element.

In accordance with still another embodiment, there is provided a method for processing data comprising the steps of:

(a) providing a pipeline processor including a plurality of individual processing elements arranged in a serial array such that a first processing element precedes a second processing element which precedes an nth processing element;

(b) providing a clock signal to each processing element of the plurality of individual processing elements in the serial array such that the clock signal arrives at each individual processing element beyond the first processing element delayed relative to the clock signal arriving at a preceding processing element;

(c) providing data to the first processing element for processing therein; and, (d) propagating the data to at least a next processing element for additional processing therein, wherein the clock signal provided to an element in the plurality of individual processing elements is delayed relative to the clock signal provided to another element of the plurality of individual processing elements by a substantial amount relative to the clock period.

In accordance with still another embodiment, there is provided a method for processing data within a pipeline processor comprising the steps of:

(a) providing a clock signal in a first direction along a first portion of the pipeline processor having a number, n, processing elements such that the clock signal arrives at each individual processing element beyond the first processing element of the first portion delayed relative to the clock signal arriving at a preceding processing element of the same first portion;

(b) providing a clock signal in a second substantially opposite direction along a second other portion of the pipeline processor having a same number, n, processing elements such that the clock signal arrives at each individual processing element beyond the first processing element of the second other portion delayed relative to the clock signal arriving at a preceding processing element of the same second other portion;

(c) providing data to the first processing element of the first portion of the pipeline processor for processing therein;

wherein the delay to the last processing element of the first portion is an approximately same delay as the delay to the last processing element of the second portion, such that at center of the pipeline processor the two adjacent processing elements are in synchronization.

In accordance with yet another embodiment, there is provided a macro for use in layout of an apparatus for processing data comprising:

a plurality of individual processing elements arranged serially and having a clock input conductor and a clock output conductor, the clock input conductor in communication with a clock conductor having increased length from the clock input conductor to each subsequent element within the within the plurality of individual processing elements and wherein the clock conductor has decreased length from the clock output conductor to each subsequent element within the within the plurality of individual processing elements, wherein the clock input conductor and output conductor are arranged such that adjacently placed macros form space efficient blocks within a layout and such that the input clock conductor of one macro and the out clock conductor of an adjacent macro when coupled have approximately a same conductor path length as the conductor path length between adjacent elements within a same macro when the macros are disposed in a predetermined space efficient placement.

Referring to FIG. 1, shown is a simplified block diagram of a pipeline processor 7 in electrical communication with a real time clock 1 via a hardware connection 2, according to a first embodiment. The pipeline processor 7 includes a plurality of arrays 4a, 4b and 5 of processor elements (processor elements not shown), for instance, arrays 4a and 4b each has 256 processing elements and array 5 has 512 processing elements. An input/output port 9 is separately in communication with the first processing element of each array 4a, 4b and 5, for receiving data for processing by the pipeline processor 7, for example from a client station (not shown) that is also in operative communication with the port 9. A clock conductor 3, in electrical communication with clock source 1 via hardware connection 2, is provided in the form of a distributed clock circuit extending in a sinuous form alongside each of arrays 4a, 4b and 5. The clock conductor 3 is also separately in electrical communication with each individual processor element of the arrays 4a, 4b and 5.

Figure 2:
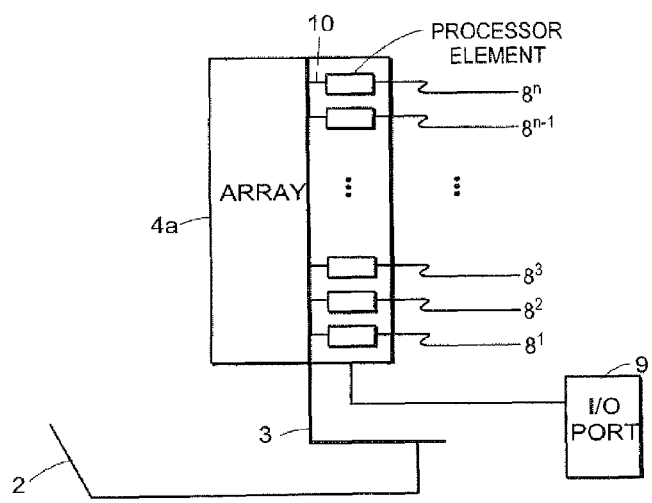
FIG. 2 shows a simplified block diagram of an array of processor elements in electrical communication with a distributed clock circuit, according to one embodiment.

Referring to FIG. 2, shown is a simplified block diagram of a serial array of processor elements $8^1, 8^2, 8^3, \ldots, 8^{n-1}$ and $8^n$, the individual processor elements 8 comprising in aggregate the array 4a of pipeline processor 7 in FIG. 1. Each processor element 8 is separately in electrical communication with the clock conductor 3 via a connection 10. The clock conductor 3 is also in electrical communication with a clock generator circuit, the clock source, via hardware connection 2. An input/output port 9 in communication with the first processing element of array 4a is for receiving data provided by a client station (not shown), also in operative communication with input/output port 9, the data for processing by the array 4a.

In operation, data is provided by the client station at port 9, for example as a stream of individual blocks of data which comprise in aggregate a complete data file. The first processor element $8^1$ in array 4a receives a first data block via port 9 and performs a predetermined first processing stage thereon. Of course, first processor element $8^1$ is time-synchronized with a memory buffer (not shown) of port 9 such that the stream of data blocks is gated to first processor element $8^1$ in synchronization. For example, clock conductor 3 provides a time signal from real time clock 1, the time signal arriving at first processor element $8^1$ at a predetermined time relative to a clock signal of the memory buffer. At the end of a first processing cycle, first processor element $8^1$ receives a second data block via port 9. At a same time the first processing element $8^1$ provides an output from the first data block along a forward processing-path to second processor element $8^2$. Additionally, the first processor element $8^1$ provides a second result calculated therein along a return processing-path to the buffer of port 9.

During a second processing cycle, first processor element $8^1$ performs a same first processing operation on the second data block and second processor element $8^2$ performs a second processing operation on the first data block. At the end of the second processing cycle, the result of processing on the first data block is propagated along the forward processing path between the second and the third processor elements $8^2$ and $8^3$, respectively. Simultaneously, the results of processing of the second data block is propagated along the forward processing path between the first and the second processor elements $8^1$ and $8^2$, respectively. Additionally, the second processor element $8^2$ provides a result calculated therein along a return processing-path to the first processor element $8^1$. Of course, simultaneously gating data blocks along the forward processing-path and along the return processing-path between adjacent processor elements requires synchronous timing. For instance, the processing operations that are performed along both processing-paths should be complete prior to the data being propagated in either direction.

Figure 3:
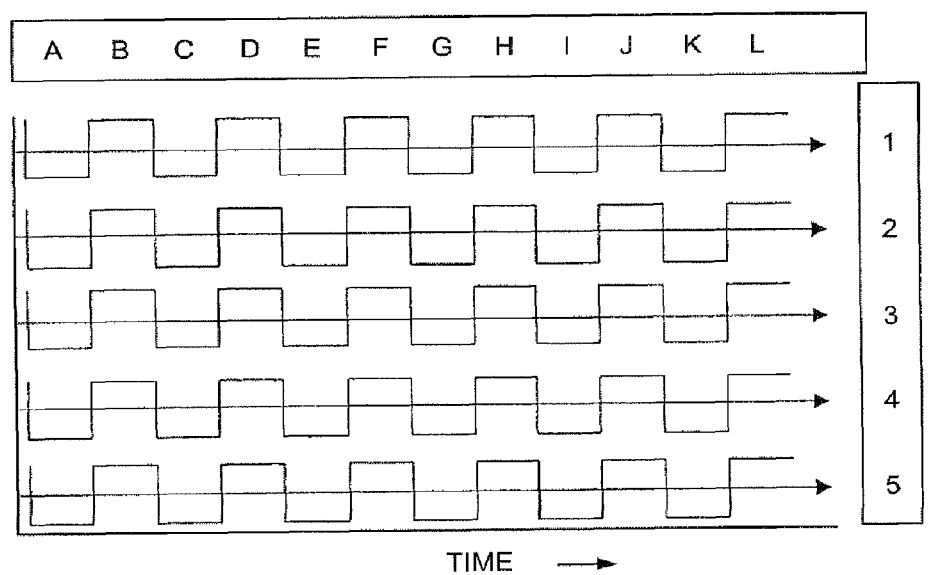
FIG. 3 shows a timing diagram for gating information to a plurality of processor elements in a prior art pipeline processor.

Referring to FIG. 3, shown is timing diagram for gating information to a plurality of processor elements in a prior art pipeline processor. By way of example, individual timing diagrams for a first five processor elements, denoted 1, 2, 3, 4 and 5, respectively, are shown. Each clock cycle is denoted by a pair of letters, for example AB, CD, EF, etc. It is assumed for the purpose of this description that information is gated to and from each processor element at a "rising edge" of any clock cycle. For instance, along the forward processing path processor element 1 gates in a first block of data at "rising edge" AB and processes the first block of data during one complete clock cycle. Similarly, processor element 2 gates in the first block of data from processing element 1 at "rising edge" CD and processes the first block of data during one complete clock cycle. Additionally, along the return processing-path, processor element 1 gates in a block of processed data from processor element 2 at "rising edge" EF.

Of course, the clock cycle rate of the prior art system is at least as long as the longest processing time required at each stage along one of the forward and the return processing paths. For example, a data stream propagates along the serial array in a stepwise fashion, and processing must be completed at every step before the data can be propagated again. Thus if processing occurs in a shorter period of time along the return processing path compared to the forward processing path, then a delay is introduced at every stage along the reverse processing path in order to allow the processing to be completed along the forward processing path.

Additionally, as is apparent from FIG. 3, every processor element must be synchronized with every other processor element of the array. For instance the clock 1 of FIG. 1 must be distributed everywhere along the array in phase. This typically is a complex problem that is costly and difficult to solve. The solutions are usually a hybrid of hardware design and integrated circuit topology design and analysis.

An approach to overcoming the problem of clock distribution is a technique wherein a first processor provides a clock signal to a second processor and from there it is provided to a third processor and so forth. Thus, between adjacent elements, synchronization exists but, between distant elements, synchronization is not assured. Unfortunately, this method of avoiding clock synchronization is performed absent a global clock and, as such, a clock is passed between every two elements requiring data communication therebetween resulting in a different clock distribution problem.

Figure 4:
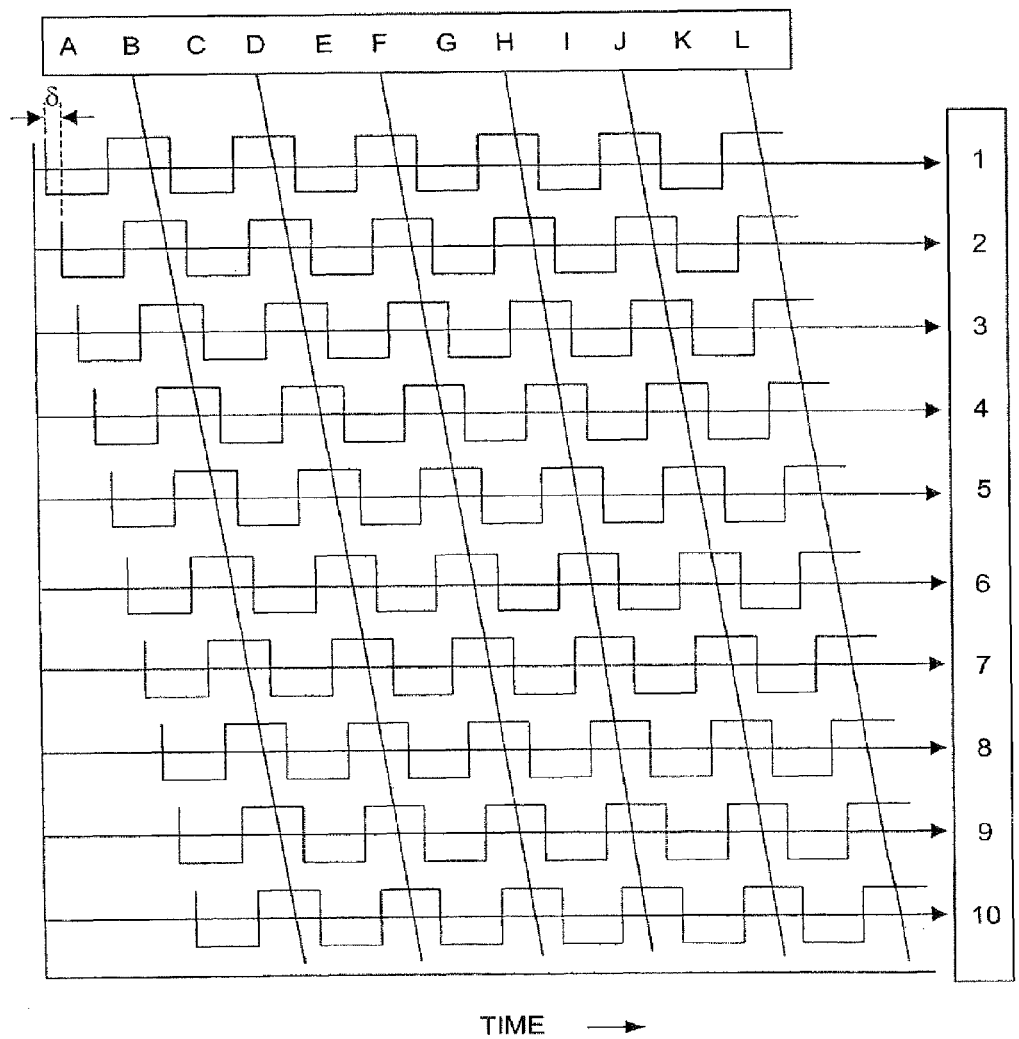
FIG. 4 shows a timing diagram for gating information to a plurality of processor elements in a pipeline processor, according to one embodiment.

Referring to FIG. 4, shown is a timing diagram for gating information to a plurality of processor elements in a pipeline processor, according to one embodiment. By way of example, the individual timing diagrams for a subset of a serial array comprising the first ten processor elements, denoted 1, 2, 3, 4, 5, 6, 7, 8, 9, and 10, respectively, are shown. Each clock cycle is denoted by a pair of letters, for example AB, CD, EF, etc. It is assumed for the purpose of this discussion that information is gated into and out of each processor element at a "rising edge" of a clock cycle. For instance, along the forward processing path processor element 1 gates in a first block of data at "rising edge" AB and processes the first block of data d during one complete clock cycle. Similarly, processor element 2 gates in the first block of data from processing element 1 at "rising edge" CD and processes the first block of data during one complete clock cycle. Additionally, along the return processing-path, processor element 1 gates in a block of processed data from processor element 2 at "rising edge" EF. It is further assumed for the purpose of this discussion that the processing operation requiring the greatest amount of time to be completed at any processor element is along the forward processing-path. Of course, as indicated by the diagonal lines in FIG. 4, the rising edge AB occurs at different times for different processing elements.

Still referring to FIG. 4, each timing diagram is offset slightly from the timing diagram for a previous processor element by an amount, δ, equal to an incremental delay of the clock signal reaching that processing element. Due to capacitance and resistance that is inherent in the circuitry comprising the clock conductor, the finite period of time, δ, elapses between the arrival of the time signal at the first processor element and the arrival of the time signal at the second processor element. Alternatively, the clock is intentionally delayed between provision to different processing elements. Thus, the time-synchronization between processor element 1 and processor element 2 is offset by the amount δ. Similarly, the time-synchronization between each of the remaining pairs of adjacent processor elements also is offset, for example by a same amount δ. Alternatively, the offset amount is different but within known tolerances.

Still referring to FIG. 4, the individual clock cycles are shorter than the clock cycles of the prior art timing diagrams shown in FIG. 3 for a same processing operation. This would seem to imply that there is insufficient time for the processor elements to complete the processing operations along the forward processing-path prior to gating in new data. For example, in FIG. 3 the clock cycle is at least as long as the longest processing operation, which operation is arranged to occur along the forward path. In the present embodiment, however, there is an incrementally increasing delay of the arrival of the clock signal at each processing element beyond processor element 1. In effect, this delay provides additional time for processing to be completed at, for example, processor element 2 in a forward processing path before a next block of data is gated in at processing block 3 from processor element 2. Advantageously, the minimum length of an individual clock cycle is reduced to a length of time equal to the time required to complete the longest processing operation less the length of the clock delay between elements in the path requiring longer processing times—here the forward path. Then, along the forward processing path more than one full clock cycle elapses between gating a block of data into a processor element and gating the processed block of data from that processor element into a next processor element. Further, along the return processing path less than one full clock cycle elapses between gating a block of data into a processor element and gating the processed block of data into a next processor element (previous in the forward path). Thus, what can be termed "catch up" is provided in the return processing-path. Accordingly, the overall cycle time is less than the time required in one direction of processing but at least an average of the processing time required in each of the two directions.

Figure 5:
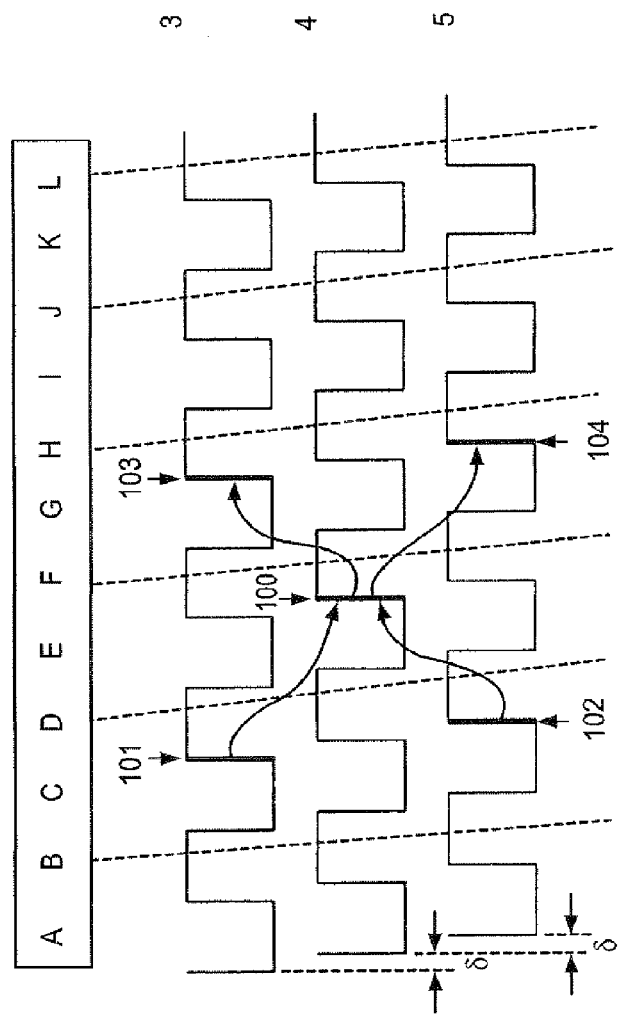
FIG. 5 shows individual timing diagrams for three adjacent processor elements within a same processor array, according to one embodiment.

Referring to FIG. 5, shown are three individual timing diagrams for three adjacent processor elements, denoted 3, 4 and 5, according to one embodiment. A first data block is gated into processor element 4 at 100 and is processed by processor element 4 during clock cycle FG. For example, processor element 4 reads the first data block from an output port of processor element 3, the first data block having been gated into processor element 3 at 101. Processor element 4 also makes the first data block available to processor element 5, for example processor element 4 provides the first data block to an output port thereof and the first data block is read by processor element 5 at, 104. Clearly, steps 101, 100 and 104 comprise a portion of the forward processing-path. As is obvious from FIG. 5, a period of time that is longer than one complete clock cycle elapses between gating a block of data into a processor element and gating a block of data resulting from processing of the same block of data into a next processor element along the forward processing-path.

Similarly, the steps 102, 100 and 103 comprise a portion of the reverse processing-path, wherein a data block including data processed by a processor element is provided to a previous processor element of the array. As is obvious from FIG. 5, a period of time that is shorter than one complete clock cycle elapses between gating a processed block of data into a processor element and gating the further processed block of data into a next processor element along the return processing-path. Advantageously, the processing delay that accumulates along the forward processing-path is "caught-up" along the return processing-path. This is a phenomenon that is referred to as "bi-directional averaging". Further, since the length of the clock cycle time is reduced, an overall advantage in increased processing speed over prior art bi-directional pipeline processors is realized, according to certain embodiments.

Figure 9:
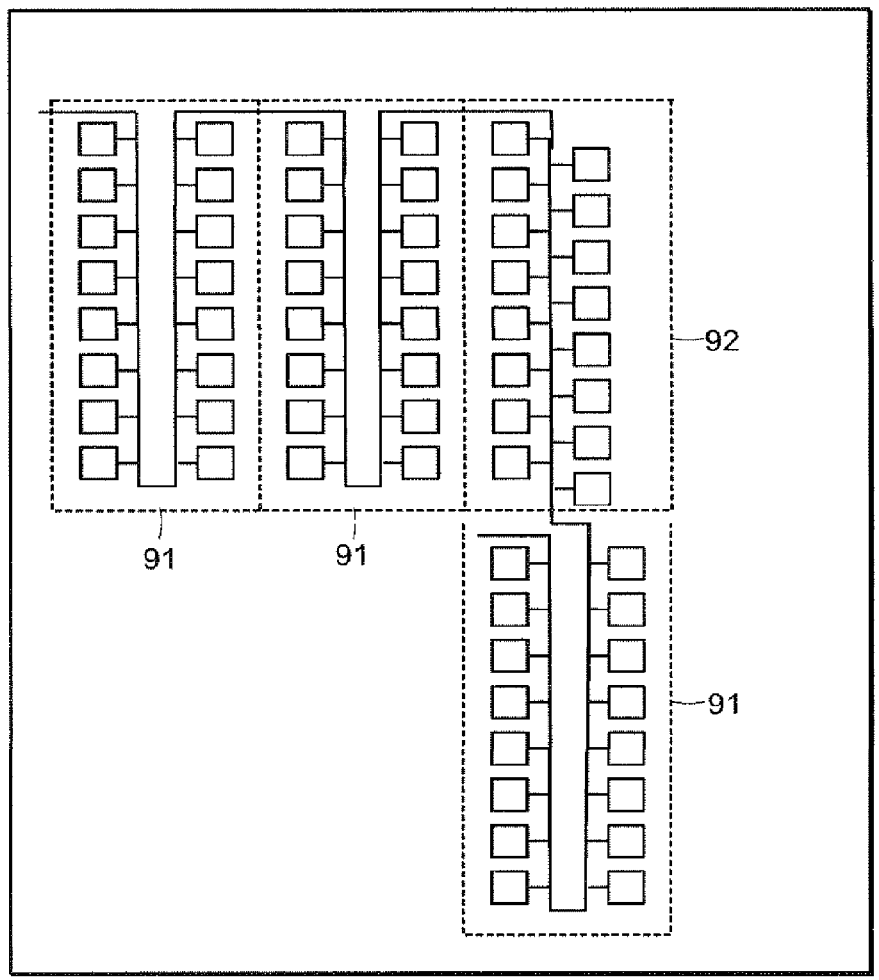
FIG. 9 is a simplified block diagram of macro blocks of processor units arranged for providing a snaking clock signal from unit to unit.

It is an advantage of certain embodiments that each processor element needs only to communicate with two adjacent elements, such that an exact delay is always determinable and can easily be maintained within predetermined limits. It is a further advantage of certain embodiments that it is possible to isolate the circuit design to n adjacent processor elements, such that the entire pipeline processor is fabricated by laying down a series of n element "macros". Of course, every once in a while it is necessary to connect one macro block to another, requiring additional circuitry to cope with an extra delay between processor elements of different macro blocks. Alternatively, macros are designed for ease of interconnection such that a macro begins and ends in a fashion compatible with positioning another identical macro adjacent thereto for continued similar performance. In FIG. 9, a diagram of 2 macro blocks 91 and 92 according to the one embodiment is shown. The macro blocks can be arranged in any of a series of arrangements as shown providing approximately consistent pathway delays between processing elements.

Figure 6:
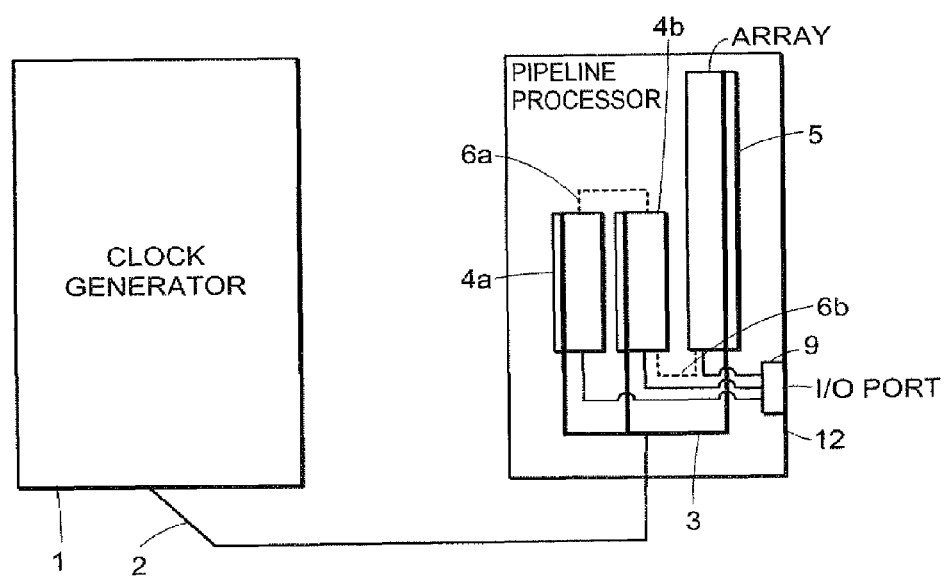
FIG. 6 shows a simplified block diagram of a pipeline processor, according to another embodiment.

Referring to FIG. 6, shown is a simplified block diagram of a pipeline processor 12 according to a second embodiment. The pipeline processor 12 includes a plurality of arrays 4a, 4b and 5 of processor elements (processor elements not shown), for instance, arrays 4a and 4b each having 256 processing elements and array 5 having 512 processing elements. Dotted lines 6a and 6b indicate optional electrical coupling for providing electrical communication between the $256^{th}$ processing element of array 4a and the $256^{th}$ element of array 4b, and between the $1^{st}$ element of array 4b and the $1^{st}$ element of array 5, respectively. A distributed clock circuit 3 is separately in electrical communication with each processor element of the arrays 4a, 4b and 5. Also shown in FIG. 6 is a clock generator 1 in electrical communication with pipeline processor 12 via a hardware connection 2. An input/output port 9 in communication with the first processing element of each array 4a, 4b, and 5 is for receiving data provided by a client station (not shown), also in operative communication with input/output port 9, the data for processing by an indicated one of the arrays 4a, 4b, and 5.

Figure 7:
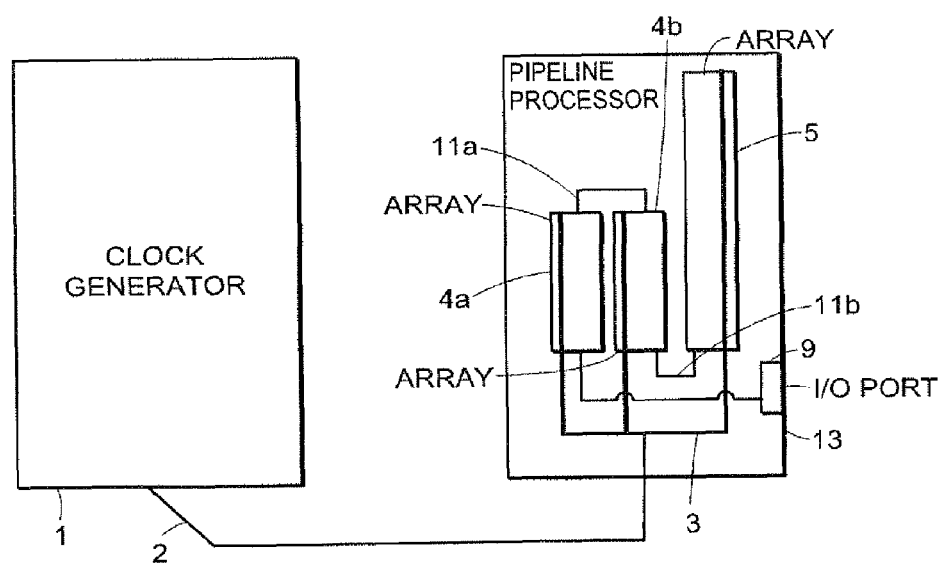
FIG. 7 shows a simplified block diagram of a pipeline processor, according to yet another embodiment.

Referring to FIG. 7, shown is a simplified block diagram of a pipeline processor 13 according to a third embodiment. The pipeline processor 13 includes a plurality of arrays 4a, 4b and 5 of processor elements (processor elements not shown), for instance, arrays 4a and 4b each having 256 processing elements and array 5 having 512 processing elements. The $256^{th}$ processing element of array 4a and the $256^{th}$ element of array 4b are in electrical communication via the hardware connection 11a, and the $1^{st}$ element of array 4b and the $1^{st}$ element of array 5 are in electrical communication via the hardware connection 11b, respectively. A distributed clock circuit 3 is separately in electrical communication with each processor element (not shown) of the arrays 4a, 4b and 5. Also shown in FIG. 7 is a real time clock 1 in electrical communication with pipeline processor 13 via a hardware connection 2. An input/output port 9 in communication with the first processing element of array 4a is for receiving data provided by a client station (not shown), also in operative communication with input/output port 9, the data for processing by the serial arrangement of the arrays 4a, 4b, and 5. Optionally, separate inputs (not shown) are provided for gating data directly to at least a processor element other than the $1^{st}$ element of array 4a.

The pipeline processors 12 and 13 of FIGS. 6 and 7, respectively, are operable in mode wherein data gated into the $256^{th}$ processor element of the array 4a is made available to the $256^{th}$ processor element of array 4b. For instance, when more than 256 processor elements are required for a particular processing operation, the effective length of the processor array is increased by continuing the processing operation within a second different array. Of course, when more than 512 processor elements are required for a particular processing operation, the effective length of the processor array is increased by continuing the processing operation within a third different array. For example, either one of the pipeline processors shown in FIGS. 6 and 7 are operable for performing: 256 bit encryption using a single array; 512 bit encryption using two different arrays; and, 1024 bit encryption using all three different arrays. Of course, optionally the $256^{th}$ processor element of array 4a is coupled to the $1^{st}$ element of array 4b, but then both the $256^{th}$ element of array 4a and the $1^{st}$ element of array 4b must be synchronized with each other and with the buffer. Such synchronization requirements increase the circuit design complexity due to the need for a uniform distributed clock. Also, in most pipeline processor arrangements it is necessary that each element provide processing operations during each clock cycle and often, clock synchronization imposes a wait state which would cause the $257^{th}$ element in the array to process data one clock cycle later than the earlier elements.

Of course, when the $256^{th}$ element of array 4a is coupled to the $256^{th}$ element of array 4b, either optionally as shown in FIG. 6 or permanently as shown in FIG. 7, the advantage of "bi-directional averaging" is lost. Advantageously, however, a plurality of separate arrays of processor elements, each array preferably comprising a same number of processor elements, is connectable in such a head-to-tail fashion. Then, the clock signal is delayed progressively along every second array, but catches-up again in between.

Of course, since clock distribution is not a significant concern and delays in clock distribution are well supported, the clock signal is optionally switched into each processing element such that the clock is provided from one of two clocking sources. Then, with a processor circuit configuration similar to that of FIG. 7, the clock is switched in direction for the second processor array and provided through coupling 11a. Thus the advantages of "catch up" are maintained and synchronization between adjacent arrays is obviated. Further, such a configuration supports arrays of various length that are couplable one to another to form longer arrays when needed without a necessity for clock synchronization therebetween. Here, every processing element within the second array requires two clock sources—one from a preceding element in a first direction and another from a preceding element in a second other direction. Since clocks are delayed between processing elements, the switching circuit merely acts to impart a portion or all of the necessary delay to the clock signal.

Figure 8A:
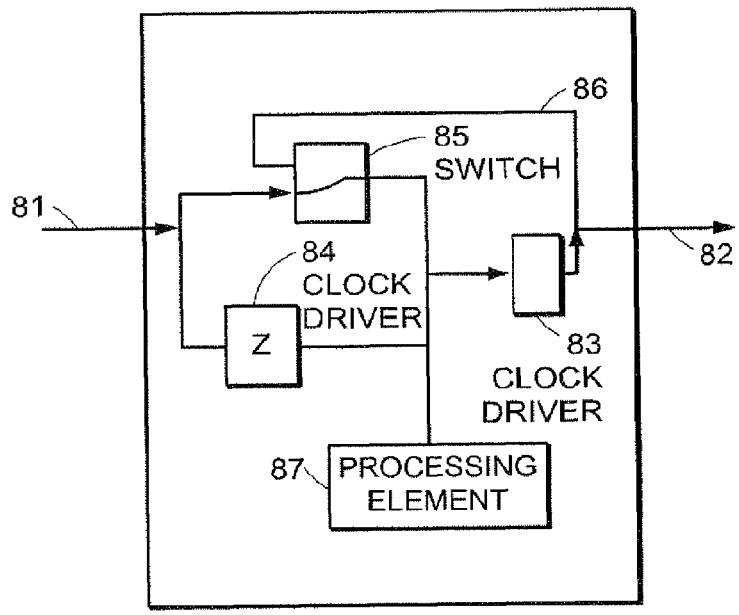
FIG. 8a shows a simplified block diagram of a processor element having a clock switching circuit and operating in a first mode, according to one embodiment.
Figure 8B:
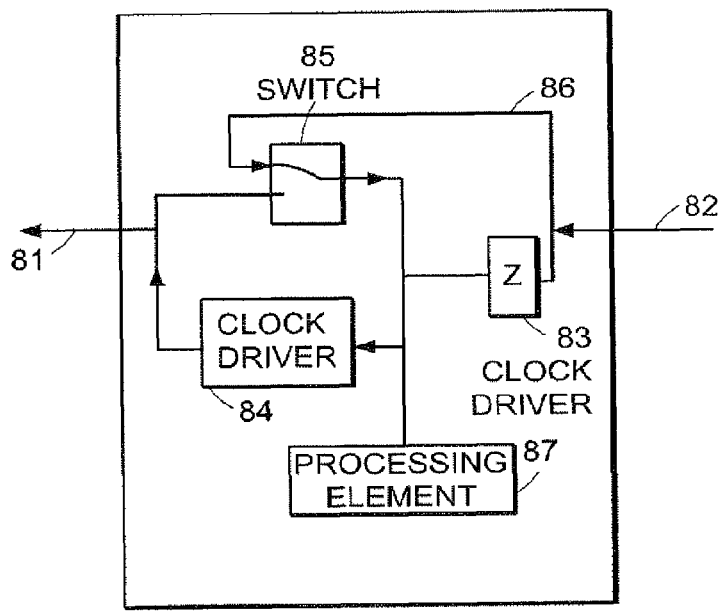
FIG. 8b shows a simplified block diagram of a processor element having a clock switching circuit and operating in a second mode, according to one embodiment.

Referring to FIG. 8, a processing element is shown having a clock switching circuit for use according to the present embodiment. A first clock signal is provided at port 81. A second other clock signal is provided at port 82. Since, in use, the clock only propagates along one direction, the ports 81 and 82 are optionally bi-directional ports. Each port is coupled to a clock driver 84 and 83 respectively. The ports are also coupled to a switch 85 for providing only one selected clock along a clock conductor 86 to the processing element 87. The clock is also provided to the two drivers only one of which is enabled. In this way, each element works to propagate a clock signal in one direction selectable from two available directions of clock propagation.

Advantageously, since it is known when a processor will complete processing, it becomes possible to allocate that processor to processing downstream of another processor. For example, assuming the processor 4a has processing elements for processing 256 bit operations and begins processing a 256 bit operation. Assume 4b is a similar processor. If, sometime after processing element 4a commences processing and before it is completed a processing request for a 512 bit operation arrives, it is possible to begin the operation on processing array 4b knowing that by the time data has propagated to the last element of processing array 4a, that element will have completed processing of the processing job in current processing. This improves overall system performance by reducing downtime of a processor while awaiting other processors to be available to support concatenated array processing.

Montgomery Based Pipeline Processing of Encryption Data

Applying Montgomery's algorithm, the cost of a modular exponentiation is reduced to a series of additions of very long integers. To avoid carry propagation in multiplication/addition architectures several solutions are known. These use Montgomery's algorithm, in combination with a redundant radix number system or a Residue Number System.

In S. E. Eldridge and C. D. Walter, "Hardware Implementation of Montgomery's Modular Multiplication Algorithm," IEEE Transactions on Computers, 42(6):693-699, July 1993, Montgomery's modular multiplication algorithm is adapted for an efficient hardware implementation. A gain in speed results from a higher clock frequency, due to simpler combinatorial logic. Compared to previous techniques based on Brickell's Algorithm, a speed-up factor of two was reported.

The Research Laboratory of Digital Equipment Corp. reported in J. E. Vuillemin, P. Bertin, D. Roncin, M. Shand, H. H. Touati, and P. Boucard, "Programmable Active Memories: Reconfigurable Systems Come of Age," IEEE Transactions on VLSI Systems, 4(1): 56-69, March 1996 and M. Shand and J. Vuillemin, "Fast Implementations of RSA Cryptography," Proceedings 11th IEEE Symposium on Computer Arithmetic, pages 252-259, 1993, an array of 16 XILINX 3090 FPGAs using several speed-up methods including the Chinese remainder theorem, asynchronous carry completion adder, and a windowing exponentiation method is used to implement modular exponentiation. The implementation computes a 970 bit RSA decryption at a rate of 185 kb/s (5.2 ms per 970 bit decryption) and a 512 bit RSA decryption in excess of 300 kb/s (1.7 ms per 512 bit decryption). A drawback of this solution is that the binary representation of the modulus is hardwired into the logic representation so that the architecture must be reconfigured with every new modulus.

The problem of using high radices in Montgomery's modular multiplication algorithm is a more complex determination of a quotient. This behavior renders a pipelined execution of the algorithm other than straightforward. In H. Orup, "Simplifying Quotient Determination in High-Radix Modular Multiplication," Proceedings 12th 20 Symposium on Computer Arithmetic, pages 193-9, 1995, the algorithm is rewritten to avoid any operation involved in the quotient determination. The necessary pre-computation is performed only once for a given modulus.

P. A. Wang in the article "New VLSI Architectures of RSA Public-Key Crypto systems," Proceedings of 1997 IEEE International Symposium on Circuits and Systems, volume 3, pages 2040-3, 1997, proposes a novel VLSI architecture for Montgomery's modular multiplication algorithm. The critical path that determines the clock speed is pipelined. This is done by interleaving each iteration of the algorithm. Compared to previous propositions, an improvement of the time-area product of a factor two was reported.

J. Bajard, L. Didier, and P. Kornerup in the article "An RNS Montgomery Modular Multiplication Algorithm," IEEE Transactions on Computers, 47(7): 766-76, July 1998, describe a new approach using a Residue Number System (RNS). The algorithm is implemented with n moduli in the RNS on n reasonably simple processors. The resulting processing time is O(n).

Of course, most of the references cited above relate to hardware implementations of processors that have little or no flexibility.

There have also been a number of proposals for systolic array architectures for modular arithmetic. These vary in terms of complexity and flexibility.

In E. F. Brickell, "A Survey of Hardware Implementations of RSA," in Advances in Cryptology—CRYPTO '89, pages 368-70, Springer-Verlag, 1990, E. F. Brickell summarizes the chips available in 1990 for performing RSA encryption.

In N. Takagi, "A Radix-4 Modular Multiplication Hardware Algorithm Efficient for Iterative Modular Multiplication Operations," Proceedings 10th IEEE Symposium on Computer Arithmetic, pages 35-42, 1991, the author proposes a radix-4 hardware algorithm. A redundant number representation is used and the propagation of carries in additions is therefore avoided. A processing speed-up of about six times compared to previous work is reported.

More recently an approach has been presented that utilizes pre-computed complements of the modulus and is based on the iterative Horner's rule in J. Yong-Yin and W. P. Burleson, "VLSI Array Algorithms and Architectures for RSA Modular Multiplication," IEEE Transactions on VLSI Systems, 5(2): 211-17, June 1997. Compared to Montgomery's algorithms these approaches use the most significant bits of an intermediate result to decide which multiples of the modulus to subtract. The drawback of these solutions is that they either need a large amount of storage space or many clock cycles to complete a modular multiplication.

The most popular algorithm for modular exponentiation is the square & multiply algorithm. Public-key encryption systems are, typically, based on modular exponentiation or repeated point addition. Both operations are in their most basic forms done by the square and multiply algorithm.

Method 1.1 compute $Z=X^E$ mod M, where $E=\Sigma_{i=0}^{n-1} e_i 2^i$, $e_i \in \{0,1\}$ 1. Z=X
2. FOR i=n−2 down to 0 DO
3. $Z=Z^2$ mod M
4. IF $e_i$=1 THEN Z=Z·X mod M
5. END FOR Method 1.1 takes 2(n−1) operations in the worst case and 1.5(n−1) on average. To compute a squaring and a multiplication in parallel, the following version of the square & multiply method can be used:

Method 1.2 computes $P=X^E$ mod M, where $E=\Sigma_{i=0}^{n-1} e_i 2^i$, $e_i \in \{0,1\}$ 1. $P_0=1$, $Z_0=X$
2. FOR i=0 to n−1 DO
3. $Z_{I+1}=Z_i^2$ mod M
4. IF $e_i$=1 THEN $P_{i+1}=P_i \cdot Z_i$ mod M
   ELSE $P_{i+1}=P_i$
5. END FOR Method 1.2 takes 2n operations in the worst case and 1.5n on average. A speed-up is achieved by applying the 1-ary method, such as that disclosed in D. E. Knuth, "The Art of Computer Programming," Volume 2: Seminumerical Algorithms, Addison-Wesley, Reading, Mass., 2nd edition, 1981, which is a generalization of Method 1.1. The 1-ary method processes 1 exponent bits at a time. The drawback here is that $(2^1-2)$ multiples of X must be pre-computed and stored. A reduction to $2^{1-1}$ pre-computations is possible. The resulting complexity is roughly n/1 multiplication operations and n squaring operations.

As shown above, modular exponentiation is reduced to a series of modular multiplication operations and squaring steps using the Montgomery method. The method for modular multiplication described below was proposed by P. L. Montgomery in P. L. Montgomery, "Modular Multiplication Without Trial Division," Mathematics of Computation, 44(170): 519-21, April 1985. It is a method for multiplying two integers modulo M, while avoiding division by M. The idea is to transform the integers in m residues and compute the multiplication with these m-residues. In the end, the representations are transformed back to a normal representation thereof. This approach is only beneficial when a series of multiplication operations in the transform domain are computed (e.g., modular exponentiation).

To compute the Montgomery multiplication, a radix R>M, with gcd(M, R)=1 is selected. Division by R is preferably inexpensive, thus an optimal choice is $R=2^m$ if $M=\Sigma_{i=0}^{m-1} m_i 2^i$. The m-residue of x is xR mod M. $M'=M^{-1}$ mod R is also computed. A function MRED(T) is provided that computes $TR^{-1}$ mod M: This function computes the normal representation of T, given that T is an m-residue.

Method 1.3 MRED(T): computes a Montgomery reduction of T $T<RM, R=2^m, M=\Sigma_{i=0}^{m-1} m_i 2^i, gcd(M,R)=1$ 1. U=TM' mod R
2. t=(T+UM)/R
3. IF t≧M RETURN t-M
   ELSE RETURN t The result of MRED (T) is $t=TR^{-1}$ mod M.

Now to multiply two integers a and b in the transform domain, where their respective representations are (aR mod M) and (bR mod M), a product of the two representations is provided to MRED(T):

$MRED((aR \bmod M) \cdot (bR \bmod M))=abR^2R^{-1}=abR \bmod M$

For a modular exponentiation this step is repeated numerous times according to Method 1.1 or 1.2 to get the final result ZR mod M or $P_n$R mod M. One of these values is provided to MRED(T) to get the result Z mod M or $P_n$ mod M.

The initial transform step still requires costly modular reductions. To avoid the division involved, compute $R^2$ mod M using division. This step needs to be done only once for a given cryptosystem. To get a and b in the transform domain MRED(a·$R^2$ mod M) and MRED(b·$R^2$ mod M) are executed to get aR mod M and bR mod M. Obviously, any variable can be transformed in this manner.

For a hardware implementation of Method 1.3: an m×m-bit multiplication and a 2m-bit addition is used to compute step 2. The intermediate result can have as many as 2m bits. Instead of computing U at once, one digit of an r-radix representation is computed at a time. Choosing a radix r, such that gcd(M, r)=1 is preferred. Division by r is also preferably inexpensive, thus an optimal choice is $r=2^k$. All variables are now represented in a basis-r representation. Another improvement is to include the multiplication A×B in the algorithm.

Method 1.4 Montgomery Modular Multiplication for computing A·B mod M, where $M==\Sigma_{i=0}^{m-1}(2^k)^i m_i, m_i \in \{0, 1 \ldots 2^k-1\}; B==\Sigma_{i=0}^{m-1}(2^k)^i b_i, b_i \in \{0, 1 \ldots 2^k-1\};$ $A==\Sigma_{i=0}^{m-1}(2^k)^i a_i, a_i \in \{0, 1 \ldots 2^k-1\};$ $A, B<M; M<R=2^{km}; M'=-M^{-1} \bmod 2^k; gcd(2^k, M)=1$ 1. $S_0=0$
2. FOR i=0 to m−1 DO
3. $q_i=(((S_i+a_iB) \bmod 2^k)M') \bmod 2^k$
4. $S_{i+1}=(S_i+q_iM+a_iB)/2^k$
5. END FOR
6. IF $S_m \geq M$ RETURN $S_m-M$
ELSE RETURN $S_m$ The result of applying the method 1.4 is $S_m=ABR^{-1}$ mod M. At most two k×k-bit multiplication operations and a k-bit addition is required to compute step 3 for a radix $2^k$. For step 4 two k×m-bit multiplication operations and two m+k-bit additions are needed. The maximal bit length of S is reduced to m+k+2 bits, compared to the 2m bits of Method 1.3.

Method 1.5 is a simplification of Method 1.4 for radix r=2. For the radix r=2, the operations in step 3 of Method 1.4 are done modulo 2. The modulus M is odd due to the condition $\gcd(M, 2_k)=1$. It follows immediately that M=1 mod 2. Hence $M'=-M_{-1}$ mod 2 also degenerates to M'=1. Thus the multiplication by M' mod 2 in step 3 is optionally omitted.

Method 1.5 Montgomery Modular Multiplication (Radix r=2) for computing

Montgomery Modular Multiplication for computing A·B mod M, where $$M==\Sigma_{i=0}^{m-1}(2^k)^i m_i, m_i\in\{0,1\}; B==\Sigma_{i=0}^{m-1}(2^k)^i b_i, b_i\in\{0,1\}; A==\Sigma_{i=0}^{m-1}(2^k)^i a_i, a_i\in\{0,1\};$$

$$A,B<M; M<R=2^m; \gcd(2, M)=1$$

1. $S_0=0$
2. FOR I=0 to m−1 DO
3. $q_i=(S_i+a_iB) \bmod 2$
4. $S_{i+1}=(S_i+q_iM+a_iB)/2$
5. END FOR
6. IF $S_m \geq M$ RETURN $S_m-M$
ELSE RETURN $S_m$ The final comparison and subtraction in step 6 of Method 1.5 would be costly to implement, as an m bit comparison is very slow and expensive in terms of resource usage. It would also make a pipelined execution of the algorithm impossible. It can easily be verified that $S_{i+1}<2M$ always holds if A, B<M. $S_m$, however, cannot be reused as input A or B for the next modular multiplication. If two more executions of the for loop are performed with $a_{m+1}=0$ and inputs A, B<2M, the inequality $S_{m+2}<2M$ is satisfied. Now, $S_{m+2}$ can be used as input B for the next modular multiplication.

To further reduce the complexity of Method 1.5, B is shifted up by one position, i.e., multiplied by two. This results in $a_i \cdot B \bmod 2=0$ and the addition in step 3 is avoided. In the update of $S_{i+1}(S_i+q_iM+a_iB)/2$ is replaced by $(S_i+q_iM)/2+a_iB$. The cost of this simplification is one more execution of the loop with $a_{m+2}=0$. The Method below comprises these optimizations.

Method 1.6 Montgomery Modular Multiplication (Radix r=2) for computing A·B mod M, where $$M==\Sigma_{i=0}^{m-1}(2^k)^i m_i, m_i\in\{0,1\}; B==\Sigma_{i=0}^{n-1}(2^k)^i b_i, b_i\in\{0,1\}; A==\Sigma_{i=0}^{m-1}(2^k)^i a_i, a_i\in\{0,1\}$$

$$A,B<2M; M<R=2^{m+2}; \gcd(2, M)=1$$

1. $S_0=0$
2. FOR i=0 to m+2 DO
3. $q_i=(S_i) \bmod 2$
4. $S_{i+1}=(S_i+q_iM)/2+a_iB$
5. END FOR The algorithm above calculates $S_{m+3}=(2^{-(m+2)}AB) \bmod M$. To get the correct result an extra Montgomery modular multiplication by $2^{2(m+2)}$ mod M is performed. However, if further multiplication operations are required as in exponentiation algorithms, it is better to pre-multiply all inputs by the factor $2^{2(m+2)}$ mod M. Thus every intermediate result carries a factor $2^{m+2}$. Montgomery multiplying the result by "1" eliminates this factor.

The final Montgomery multiplication with "1" insures that a final result is smaller than M.

High-Radix Montgomery Algorithm

By avoiding costly comparison and subtraction operations of step 6 and changing the conditions to $4M<2^{km}$ and A, B<2M some optimisation results for implementing method 1.4 in hardware. The penalty is two more executions of the loop. The resulting method is as follows:

Method 1.7 Montgomery Modular Multiplication for computing A·B mod M, where $$M==\Sigma_{i=0}^{m-3}(2^k)^i m_i, m_i\in\{0, 1 \ldots 2^k-1\};$$

$$\tilde{M}=(M' \bmod 2^k)M, \tilde{M}==\Sigma_{i=0}^{m-2}(2^k)^i \tilde{m}_i, \tilde{m}_i\in\{0, 1 \ldots 2^k-1\};$$

$$B==\Sigma_{i=0}^{m-1}(2^k)^i b_i, b_i\in\{0, 1 \ldots 2^k-1\};$$

$$A==\Sigma_{i=0}^{m-1}(2^k)^i a_i, a_i\in\{0, 1 \ldots 2^k-1\};$$

$$A,B<2\tilde{M}; 4\tilde{M}<2^{km}; M'=-M^{-1}=\bmod 2^k$$

1. $S_0=0$
2. FOR i=0 to m−1 DO
3. $q_i=(S_i+a_iB) \bmod 2^k$
4. $S_{i+1}=(S_i+q_i\tilde{M}+a_iB)/2^k$
5. END FOR The quotient $q_i$ determination complexity is further reduced by replacing B by B·2k. Since $a_iB \bmod 2^k=0$, step 3 is reduced to $q_i=S_i \bmod 2^k$. The addition in step 3 is avoided at the cost of an additional iteration of the loop, to compensate for the extra factor $2^k$ in B. A Montgomery method optimized for hardware implementation is shown below:

Method 1.8 Montgomery Modular Multiplication for computing A·B mod M, where $$M==\Sigma_{i=0}^{m-3}(2^k)^i m_i, m_i\in\{0, 1 \ldots 2^k-1\}$$

$$\tilde{M}=(M' \bmod 2^k)M, \tilde{M}==\Sigma_{i=0}^{m-2}(2^k)^i \tilde{m}_i, \tilde{m}_i\in\{0, 1 \ldots 2^k-1\};$$

$$B==\Sigma_{i=0}^{m-1}(2^k)^i b_i, b_i\in\{0, 1 \ldots 2_k-1\};$$

$$A,B<2\tilde{M}; 4\tilde{M}<2^{km}; M'=-M^{-1} \bmod 2^k$$

1. $S_0=0$
2. FOR i=0 to m−1 DO
3. $q_i=S_i \bmod 2^k$
4. $S_{i+1}=(S_i+q_i\tilde{M})/2^k+a_iB$
5. END FOR The final result is then Montgomery multiplied by 1 to eliminate the factors therein as discussed herein above.

In a thesis submitted to the Faculty of the Worcester Polytechnic Institute entitled Modular Exponentiation on Reconfigurable Hardware and submitted by Thomas Blum on Apr. 8, 1999 incorporated herein by reference, Thomas Blum proposed two different pipeline architectures for performing encryption functions using modular multiplication and Montgomery spaces: an area efficient architecture based on Method 1.6 and a speed efficient architecture. As target devices Xilinx XC4000 family devices were used.

A general radix 2 systolic array uses m times m processing elements, where m is the number of bits of the modulus and each element processes a single bit. 2m modular multiplication operations can be processed simultaneously, featuring a throughput of one modular multiplication per clock cycle and a latency of 2m cycles. As this approach results in unrealistically large CLB counts for typical bit lengths required in modern public-key schemes, only one row of processing elements was implemented. With this approach two modular multiplication operations can be processed simultaneously and the performance reduces to a throughput of two modular multiplication operations per 2m cycles. The latency remains 2m cycles.

The second consideration was the choice of the radix $r=2^k$. Increasing k reduces the amount of steps to be executed in Method 1.8. Such an approach, however, requires more resources; The main expense lies in the computation of the $2^k$ multiples of M and B. These are either pre-computed and stored in RAM or calculated by a multiplexer network. Clearly, the CLB count becomes smallest for r=2, as no multiples of M or B have to be calculated or pre-computed.

Using a radix r=2, the equation according to Method 1.6 is computed. To further reduce the required number of CLBs the following measures are optionally taken: each unit processes more than a single bit. A single adder is used to precompute B+M and to perform the other addition operation during normal processing. Squares and multiplication operations are computed in parallel. This design is divided hierarchically into three levels.

Processing Element Computes a bits of a modular multiplication.

Modular Multiplication An array of processing elements computes a modular multiplication.

Modular Exponentiation Combine modular multiplication operations to a modular exponentiation according to Algorithm 1.2.

Processing Elements

Figure 10:
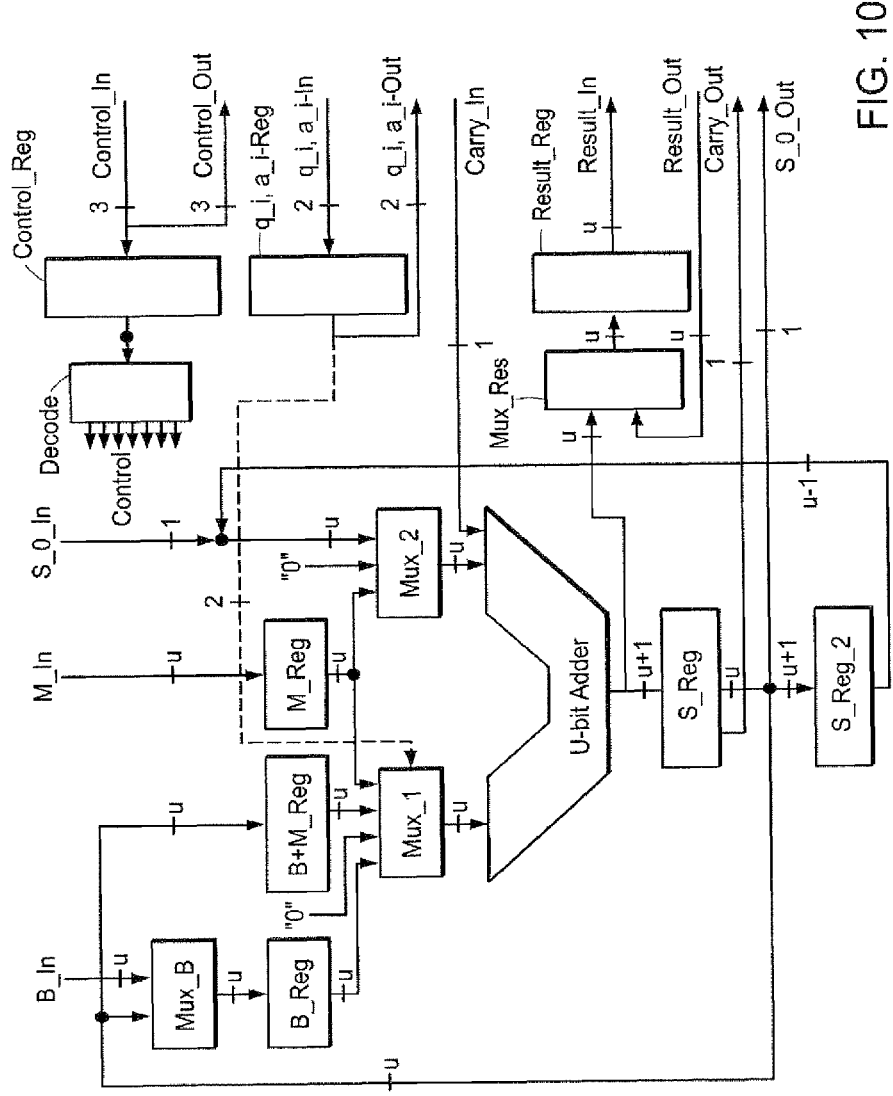
FIG. 10 is a block diagram of a resource efficient processing element design for use in a pipeline array processor for performing encryption functions.

FIG. 10 shows the implementation of a processing element. In the processing elements the following registers are present:

M-Reg (u bits): storage of the modulus
B-Reg (u bits): storage of the B multiplier
B+M-Reg (u bits): storage of the intermediate result B+M
S-Reg (u+1 bits): storage of the intermediate result (inclusive carry)
S-Reg-2 (u−1 bits): storage of the intermediate result
Control-Reg (3 bits): control of the multiplexers and clock enables
$a_i, q_i$ (2 bits): multiplier A, quotient Q
Result-Reg (u bits): storage of the result at the end of a multiplication The registers need a total of (6u+5)/2 CLBs, the adder u/2+2 CLBs, the multiplexers 4·u/2 CLBs, and the decoder 2 CLBs. The possibility of re-using registers for combinatorial logic allows some savings of CLBs. $Mux_B$ and $Mux_{Res}$ are implemented in the CLBs of B-Reg and Result-Reg, $Mux_1$ and $Mux_2$ partially in M-Reg and B+M-Reg. The resulting costs are approximately 3u+4 CLBs per u-bit processing unit. That is 3 to 4 CLBs per bit, depending on the unit size u.

Before a unit can compute a modular multiplication, the system parameters have to be loaded. M is stored into M-Reg of the unit. At the beginning of a modular multiplication, the operand B is loaded from either B-in or S-Reg, according to the select line of multiplexer B-Mux. The next step is to compute M+B once and store the result in the B+M-Reg. This operation needs two clock cycles, as the result is clocked into S-Reg first. The select lines of $Mux_i$ and $Mux_2$ are controlled by $a_i$ or the control word respectively.

In the following 2(m+2) cycles a modular multiplication is computed according to Method 1.6. Multiplexer $Mux_i$, selects one of its inputs 0, M, B, B+M to be fed in the adder according to the value of the binary variables $a_i$ and $q_i$. $Mux_2$ feeds the u−1 most significant bits of the previous result S-$Reg_2$ plus the least significant result bit of the next unit (division by two/shift right) into the second input of the adder. The result is stored in S-Reg for one cycle. The least significant bit goes into the unit to the right (division by two/shift right) and the carry to the unit to the left. In this cycle a second modular multiplication is calculated in the adder, with updated values of S-$Reg_2$, $a_i$ and $q_i$. The second multiplication uses the same operand B but a different operand A.

At the end of a modular multiplication, $S_{m+3}$ is valid for one cycle at the output of the adder. This value is both stored into Result-Reg, as fed via S-Reg into B-Reg. The result of the second multiplication is fed into Result-Reg one cycle later.

Figure 11:
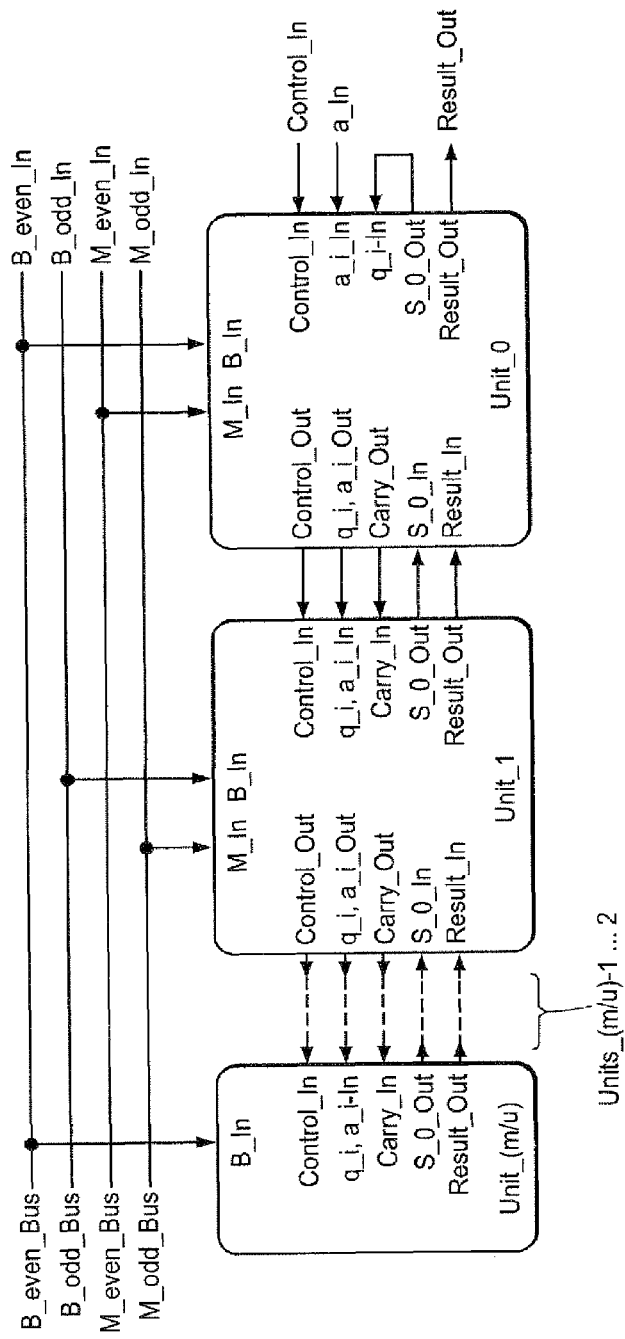
FIG. 11 is a block diagram of a systolic array for modular multiplication.

FIG. 11 shows how the processing elements are connected to an array for computing an m-bit modular multiplication. To perform the method for m bits with a bits processed per unit m/u+1 units are used. $Unit_0$ has only u−1 B inputs as $B_o$ is added to a shifted value $S_i+q_iM$. The result bit S-$Reg_0$ is always zero according to the properties of Montgomery's algorithm. $Unit_{m/u}$ processes the most significant bit of B and the temporary overflow of the intermediate result $S_{i+r}$. There is no M input into this unit.

The inputs and outputs of the units are connected to each other in the following way. The control word, $q_i$ and $a_i$ are pumped from right to left through the units. The result is pumped from left to right. The carry-out signals are fed to the carry-in inputs to the right. Output S_0_Out is always connected to input S_0_In of the unit to the right. This represents the division by 2 of the equation.

At first the modulus M is fed into the units. To allow enough time for the signals to propagate to all the units, M is valid for two clock cycles. We use two M-Buses, the M-even-Bus connected to all even numbered units and the M-odd-Bus connected to all odd numbered units this approach allows to feed a bits to the units per clock cycle. Thus it takes m/u cycles to load the full modulus M.

The operand B is loaded similarly. The signals are also valid for two clock cycles. After the operand B is loaded, the performance of the steps of Method 1.6 begins.

Starting at the rightmost unit, $unt_0$, the control word, $a_i$, and $q_i$ are fed into their registers. The adder computes S-Reg-2 plus B, M, or B+M in one clock cycle according to $a_i$ and $q_i$. The least significant bit of the result is read back as qi+1 for the next computation. The resulting carry bit, the control word, $a_i$ and $q_i$ are pumped into the unit to the left, where the same computation takes place in the next clock cycle.

In such a systolic fashion the control word, $a_i$, $q_i$ and the carry bits are pumped from right to left through the whole unit array. The division by two in Method 1.6 leads also to a shift-right operation. The least significant bit of a unit's addition ($S_0$) is always fed back into the unit to the right. After a modular multiplication is completed, the results are pumped from left to right through the units and consecutively stored in RAM for further processing.

A single processing element computes u bits of $S_{i+1}=(S_i+q_i·M)/2+a_i·B$. In clock cycle i, $unit_o$ computes bits 0 ... u−1 of $S_i$. In cycle i+1, $unit_1$ uses the resulting carry and computes bits u ... 2u−1 of $S_i$. $Unit_0$ uses the right shifted (division by 2) bit u of $S_i$ ($S_0$) to compute bits 0 ... u−1 of $S_{i+1}$ in clock cycle i+2. Clock cycle i+1 is unproductive in $unit_o$ while waiting for the result of $unit_1$. This inefficiency is avoided by computing squares and multiplication operations in parallel according to Method 1.2. Both $p_{i+1}$ and $z_{i+1}$ depend on $z_i$. So, the intermediate result $z_i$ is stored in the B-Registers and fed with $p_i$ into the $a_i$ input of the units for squaring and multiplication.

Figure 12:
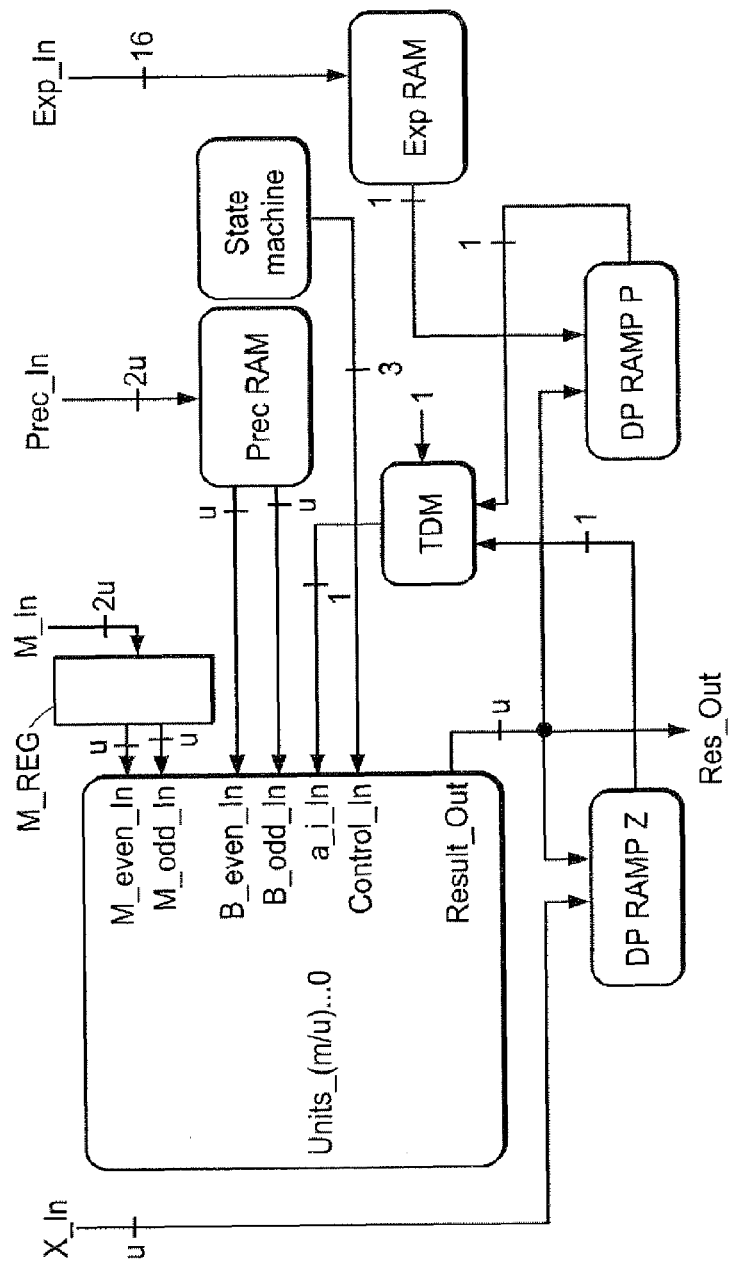
FIG. 12 is a block diagram of a single unit with its input pathways shown.

FIG. 12 shows how the array of units is utilized for modular exponentiation. At the heart of the design is a finite state machine (FSM) with 17 states. An idle state, four states for loading the system parameters, and four times three states for computing the modular exponentiation. The actual modular exponentiation is executed in four main states, pre-computation1, pre-computation2, computation, and post-computation. Each of these main states is subdivided in three sub-states, load-B, B+M, and calculate-multiplication. The control word fed into control-in is encoded according to the states. The FSM is clocked at half the clock rate. The same is true for loading and reading the RAM and DP RAM elements. This measure makes sure the maximal propagation time is in the units. Thus the minimal clock cycle time and the resulting speed of a modular exponentiation relates to the effective computation time in the units and not to the computation of overhead.

Before a modular exponentiation is computed, the system parameters are loaded. The modulus M is read 2u bits at the time from I/O into M-Reg. Reading starts from low order bits to high order bits. M is fed from M-Reg a bits at the time alternatively to M-even-Bus and M-odd-Bus. The signals are valid two cycles at a time. The exponent E is read 16 bits at the time from I/O and stored into Exp-RAM. The first 16 bit wide word from I/O specifies the length of the exponent in bits. Up to 64 following words contain the actual exponent. The pre-computation factor $2^{2(m+2)}$ mod M is read from I/O 2u bits at the time. It is stored into Prec-RAM.

In state Pre-compute1 we read the X value from I/O, a bits per clock cycle, and store it into DP RAM Z. At the same time the pre-computation factor $2^{2(m+2)}$ mod M is read from Prec RAM and fed u bits per clock cycle alternatively via the B-even-Bus and B-odd-Bus to the B-registers of the units. In the next two clock cycles, B+M is calculated in the units.

The initial values for Method 1.2 are available. Both values have to be multiplied by 2, which can be done in parallel as both multiplication operations use a common operand $2^{2(m+2)}$ mod M that is already stored in B. The time-division-multiplexing (TDM) unit reads X from DP RAM Z and multiplexes X and 1. After 2(m+3) clock cycles the low order bits of the result appear at Result-Out and are stored in DP RAM Z. The low order bits of the next result appear at Result-Out one cycle later and are stored in DP RAM P. This process repeats for 2m cycles, until all digits of the two results are saved in DP RAM Z and DP RAM P. The result $X \cdot 2^{m+2}$ mod M is also stored in the B-registers of the units.

In state pre-compute2 the actual steps of Method 1.2 begin. For both calculations of Z1 and P1 Z0 is used as an operand. This value is stored in the B-registers. The second operand Z0 or P0 respectively, is read from DP RAM Z and DP RAM P and "pumped" via TDM as $a_i$ into the units. After another 2(m+3) clock cycles the low order bits of the result of Z1 and P1 appear at Result-Out. Z1 is stored in DP RAM Z. P1 is needed only if the first bit of the exponent e0 is equal to "1". Depending on e0, P1 is either stored in DP RAM P or discarded.

In state compute the loop of method 1.2 is executed n−1 times. $Z_i$ in DP RAM Z is updated after every cycle and "pumped" back as $a_i$ into the units. $P_i$ in DP RAM P is updated only if the relevant bit of the exponent $e_i$ is equal to "1". In this way always the last stored P is "pumped" back into the units.

After the processing of $e_{n-1}$, the FSM enters state post-compute. To eliminate the factor 2 m+2 from the result $P_n$, a final Montgomery multiplication by 1 is computed. First the vector 0, 0, ... 0, 1 isfed alternatively via the B-even-Bus and B-odd-Bus into the B-registers of the units. $P_n$ is "pumped" from DP RAM P as $a_i$ into the units. After state post-compute is executed, a bits of the result $P_n$=XE mod M are valid at the I/O port. Every two clock cycles another u bits appear at I/O. State pre-compute1 can be re-entered immediately now for the calculation of another X value.

A full modular exponentiation is computed in 2(n+2)(m+4) clock cycles. That is the delay it takes from inserting the first a bits of X into the device until the first u result bits appear at the output. At that point, another X value can enter the device. With a additional latency of m/u clock cycles the last a bits appear on the output bus.

Figure 13:
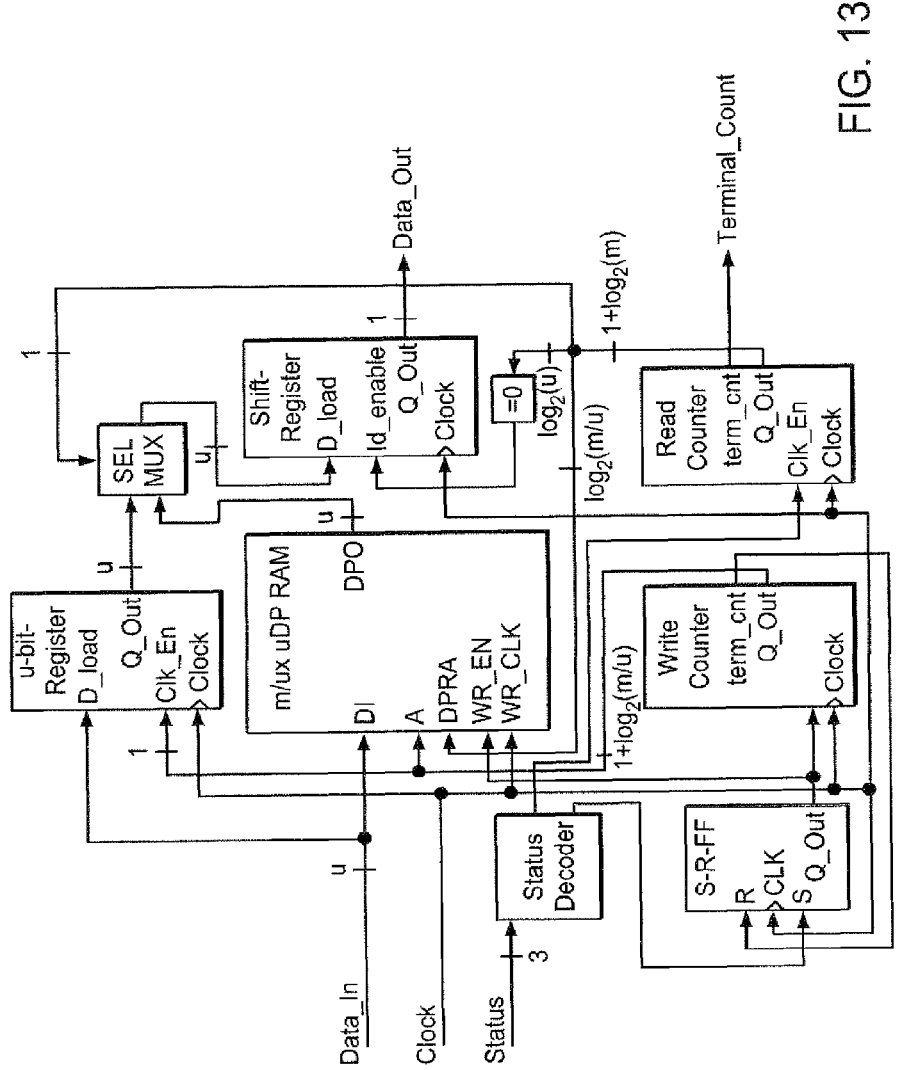
FIG. 13 is a block diagram of a DP RAM Z unit.

Hereinbelow the function blocks in FIG. 12 are explained. FIG. 13 shows the design of DP RAM Z. An m/u x u bit DP RAM is at the heart of this unit. It has separate write (A) and read (DPRA) address inputs. The write-counter counting up to m/u computes the write address (A). The write-counter starts counting (clock-enable) in substates B-load when the first a bits of Z; appear at data in. At the same time the enable signal of the DP RAM is active and data is stored in DP RAM. Terminal-count resets count-enable and write-enable of DP RAM when m/u is reached. The read-counter is enabled in the sub-states compute. When read-counter reaches its upper limit m+2, terminal-count triggers the FSM to transit into sub-state B-load. The $\log_2(m/u)$ most significant bits of the read-counter value (q out) address DPRA of the DP RAM. Every u cycles another value stored in the DP RAM is read. This value is loaded into the shift register when the $\log_2(u)$ least significant bits of q out reach zero. The next u cycles u bits appear bit by bit at the serial output of the shift register. The last value of $z_i$ is stored in a u-bit register. This measure allows us to select an m/uxu-bit DP RAM instead of an 2 m/uxu-bit DP RAM (m=2x, x=8, 9, 10).

DP RAM P works almost the same way. It has an additional input $e_i$, that activates the write-enable signal of the DP RAM in the case of $e_i$=1.

Figure 14:
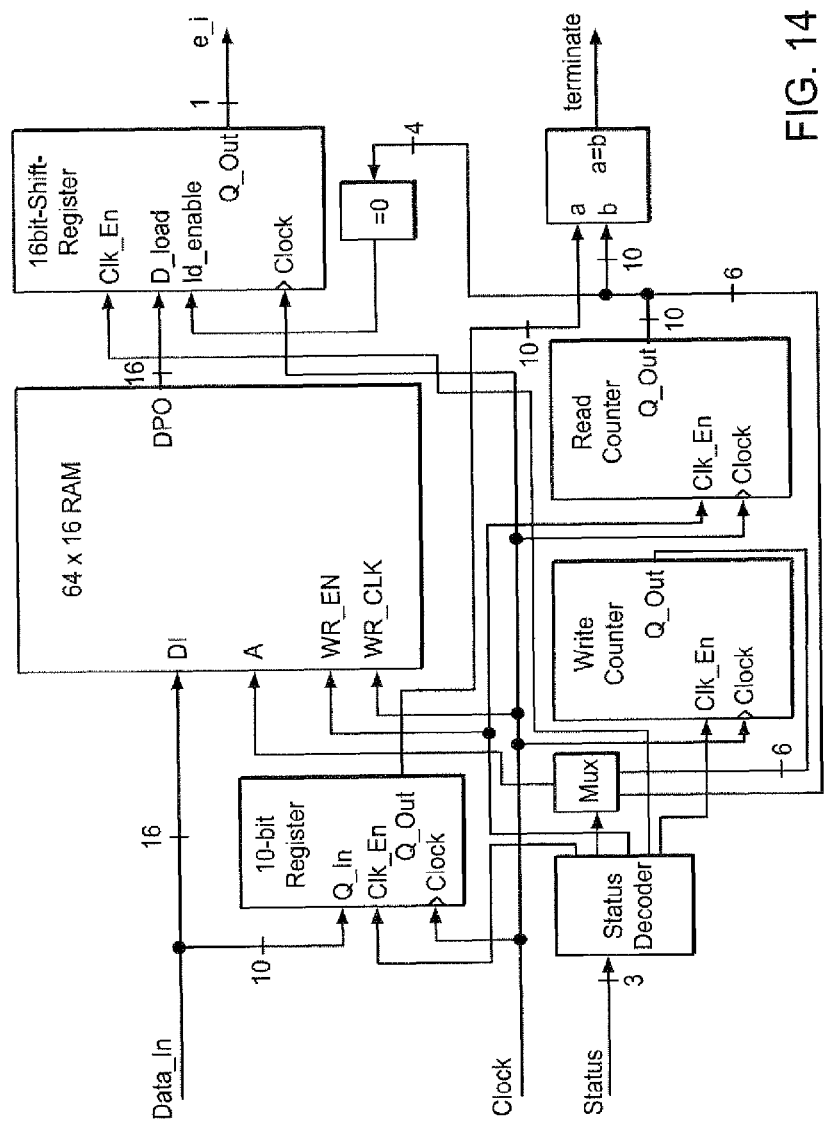
FIG. 14 is a block diagram of an Exp RAM unit.

FIG. 14 shows the design of Exp RAM. In the first cycle of the load-exponent state, the first word is read from I/O and stored into the 10-bit register. Its value specifies the length of the exponent in bits. In the next cycles the exponent is read 16-bit at a time and stored in RAM. The storage address is computed by a 6-bit write counter. At the beginning of each compute state the 10-bit read counter is enabled. Its 6 most significant bits compute the memory address. Thus every 16th activation, a new value is read from RAM. This value is stored in the 16-bit shift-register at the same time when the 4 least significant bits of read counter are equal to zero. When read counter reaches the value specified in the 10-bit register, the terminate signal triggers the FSM to enter state postcompute.

Figure 15:
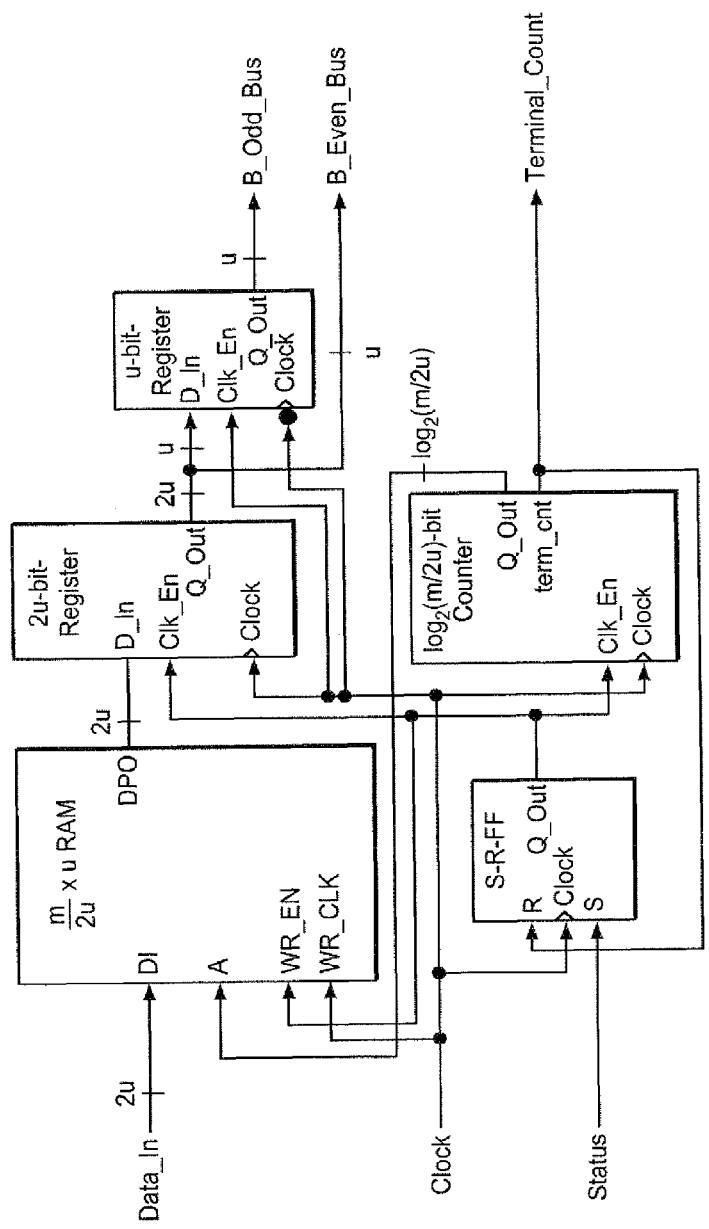
FIG. 15 is a block diagram of a Prec RAM unit.

FIG. 15 shows the design of Prec RAM. In state load-prefactor the pre-computation factor is read 2u bits at the time from I/O and stored in RAM. A counter that counts up to m/2u addresses the RAM. When all m/2u values are read, the terminal-count signal triggers the FSM to leave state load-prefactor.

In state pre-compute1 the pre-computation factor is read from RAM and fed to the B-registers of the units. The counter is incremented each clock cycle and 2u bits are loaded in the 2u-bit register. From there u bits are fed on B-even-bus each positive edge of the clock. On the negative clock edge, u bits are fed on the B-odd-bus.

A Speed Efficient Architecture

The above design was optimized in terms of resource usage. Using a radix $r=2^k$ k>1, reduces the number of steps in Method 1.6 by a factor k. The computation of Method 1.8 is executed m+3 times (i=0 to m+2)

A speed efficient design is readily divided hierarchically into three levels. Processing Element Computes 4 bits of a modular multiplication.

Modular Multiplication An array of processing elements computes a modular multiplication.

Modular Exponentiation Combines modular multiplication operations to a modular exponentiation according to Method 12.

Figure 16:
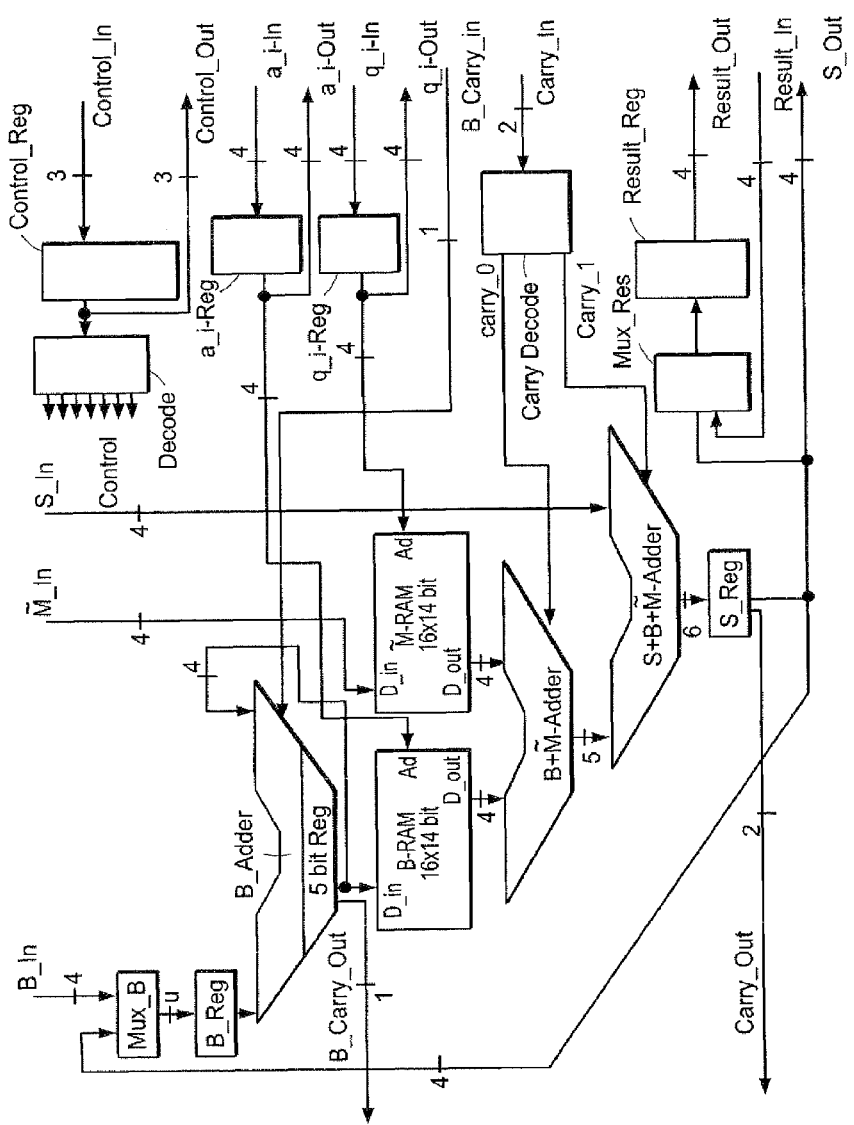
FIG. 16 is a block diagram of a speed efficient processing element design for use in a pipeline array processor for performing encryption functions.

FIG. 16 shows the implementation of a processing element. The following elements are provided:
B-Reg (4 bits): storage of the B multiplier
B-Adder-Reg (5 bits): storage of multiples of B
S-Reg (4 bits): storage of the intermediate result S;
Control-Reg (3 bits): control of the multiplexers and clock enables
$a_i$-Reg (4 bits): multiplier A
$q_i$-Reg (4 bits): quotient Q
Result-Reg (4 bits): storage of the result at the end of a multiplication
B-Adder (4 bits): Adds B to the previously computed multiple of B
B+M-Adder (4 bits): Adds a multiple of M to a multiple of B
S+B+M-Adder (5 bits): Adds the intermediate result $M^s i^{to\ B+}$
B-RAM (16×4 bits): Stores 16 multiples of B
M-RAM (16×4 bits): Stores 16 multiples of M The operation of the units is evident from the thesis of T. Blum, referenced above, and from a review of the diagrams.

Figure 17:
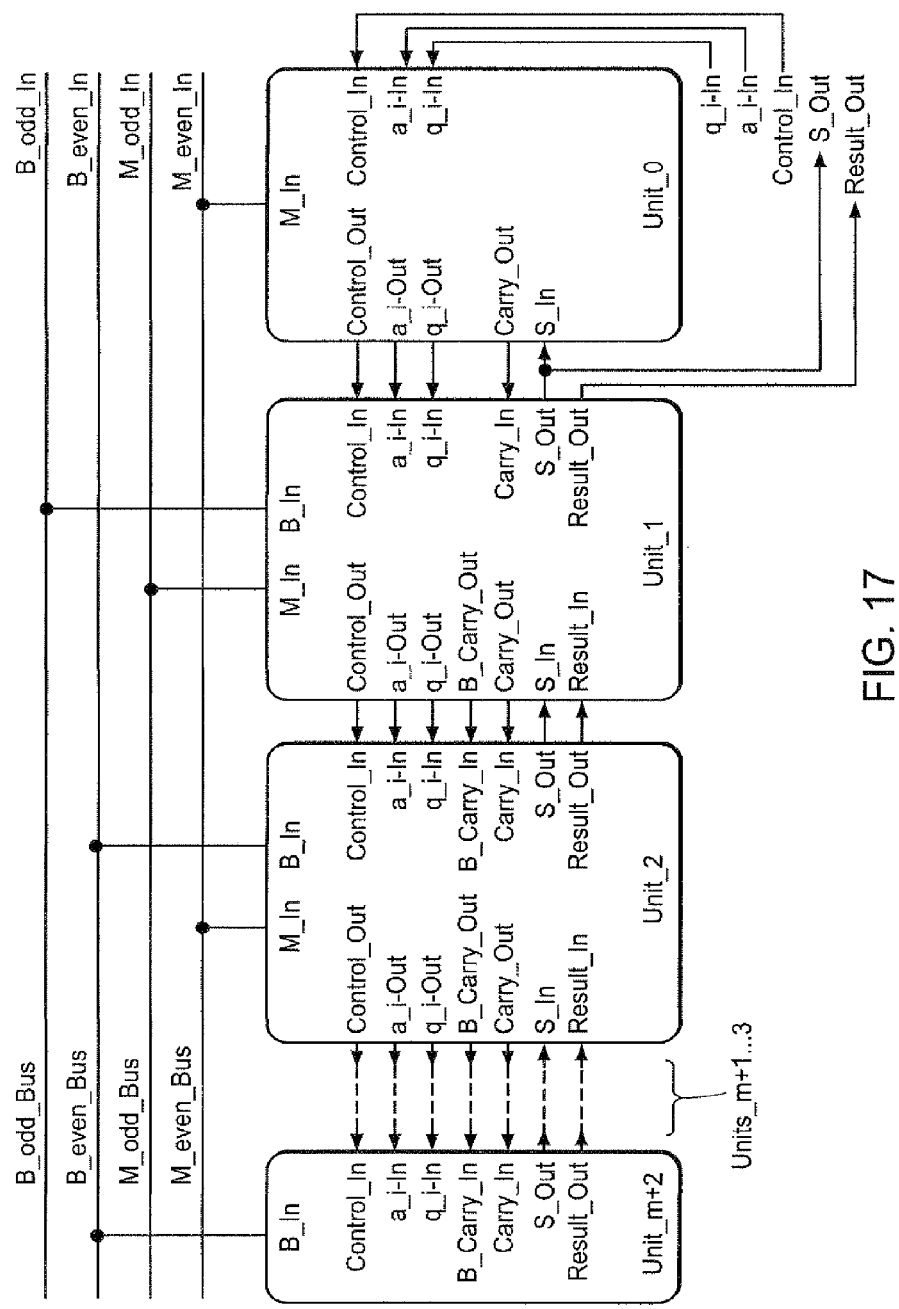
FIG. 17 is a block diagram of a systolic array for modular multiplication.

FIG. 17 shows how the processing elements are connected to an array for computing a full size modular multiplication.

Figure 18:
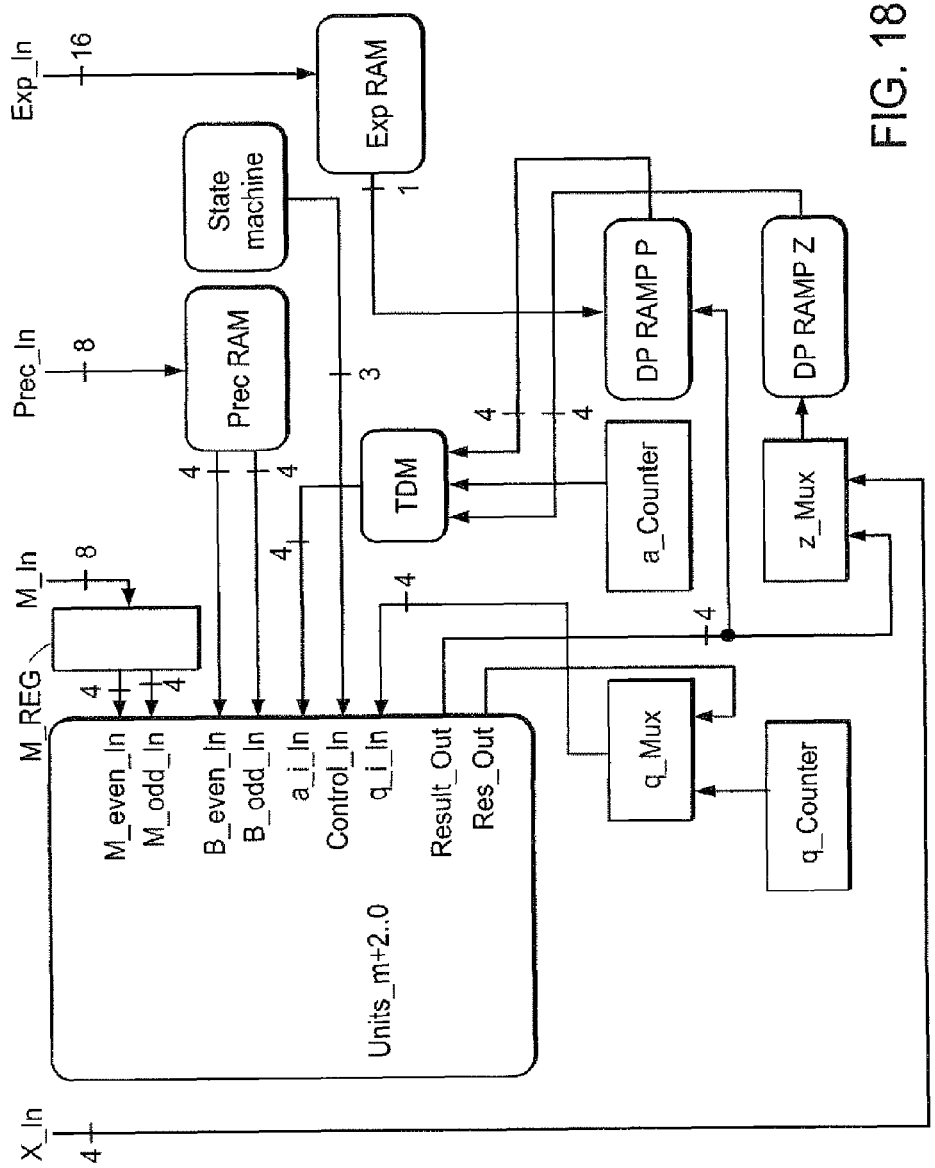
FIG. 18 is a block diagram of a single unit with its input pathways shown.

FIG. 18 shows how the array of units is utilized for modular exponentiation.

Figure 19:
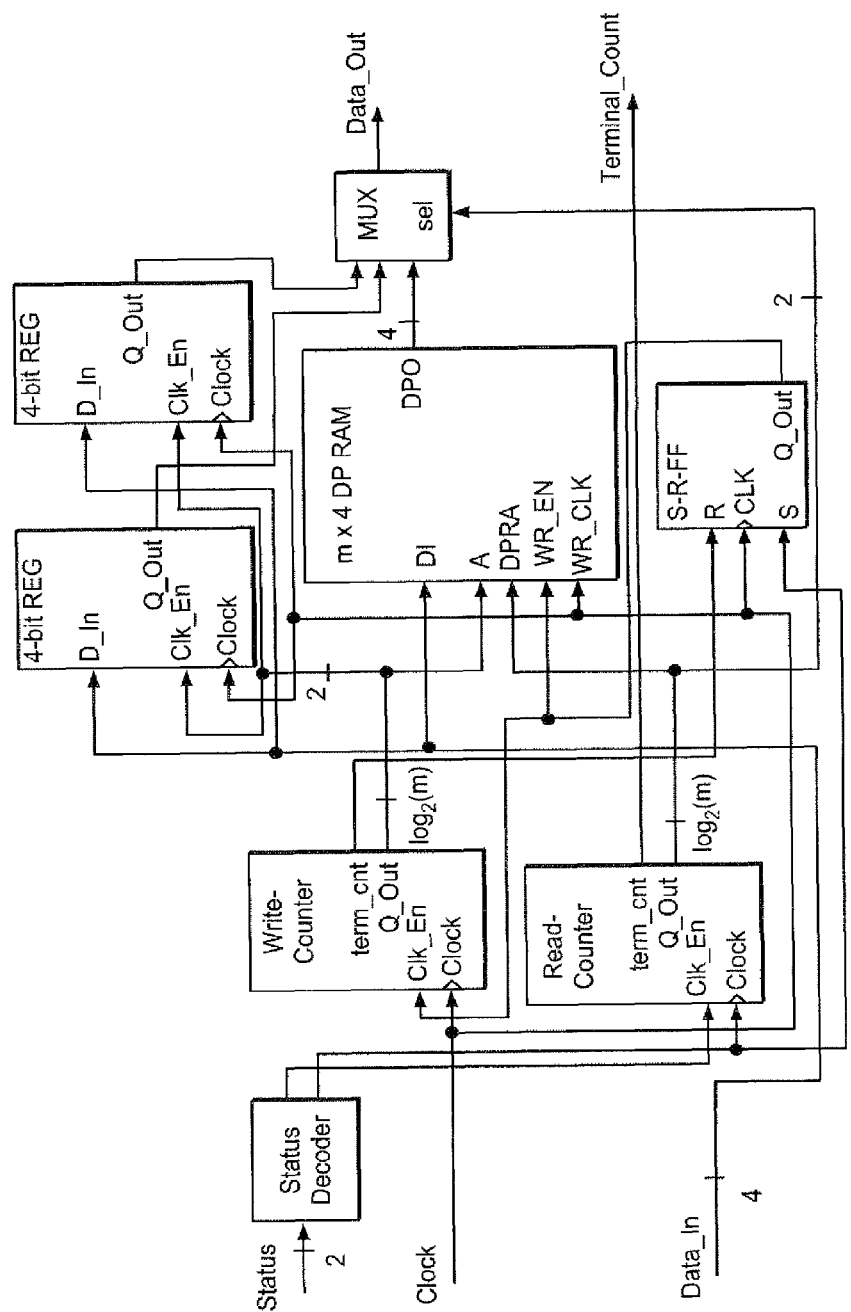
FIG. 19 is a block diagram of a DP RAM Z unit.

FIG. 19 shows the design of DP RAM Z. An m×4 bit DP RAM is at the heart of this unit. It has separate write (A) and read (DPRA) address inputs. Two counters that count up to m+2 compute these addresses. The write-counter starts counting (clock-enable) in sub-states B-load when the first digit of $Z_i$ appears at data in. At the same time the enable signal of the DP RAM is active and data is stored in DP RAM. When m+2 is reached, the terminal-count signal of the write-counter resets the two enable signals. The read-counter is enabled in sub-states compute. The data of DP RAM is addressed by q out of the read-counter and appears immediately at DPO. When read-counter reaches m+2, terminal-count triggers the FSM to transit into sub-state B-load. The last two values of $z_i$ are stored in a 4-bit register each.

This measure allows us to choose a 100% utilized m×4-bit DP RAM instead of an only 50% utilized 2m×4-bit DP RAM. DP RAM P works almost the same way. It has an additional input $e_i$, that activates the write-enable signal of the DP RAM in the case of $e_i$="1."

Since the above pipeline processor architectures embody many pipelined processing elements, it is often difficult and costly to synchronise each element to the clock source within a same integrated circuit. Therefore, certain embodiments described above advantageously reduce overall resource requirements by reducing clock distribution problems. Also, since in one direction addition is required while in the other direction multiplication is required, it is evident that more time is necessary along one path than the other and, so, time-averaging of the paths is possible in accordance with various embodiments.

Numerous other embodiments may be envisaged without departing from the spirit or scope of the invention.

The invention claimed is:

1. A method comprising:
providing an incrementally delayed clock signal to a plurality of serially connected processing elements, wherein the plurality of serially connected processing elements form an array having a forward path and a reverse path and wherein the processing elements have a forward processing time interval in the forward path and a reverse processing time interval in the reverse path;
in response to receiving the incrementally delayed clock signal at an individual processing element, initiating the forward and reverse processing time intervals of the individual processing element; and
terminating the forward processing time interval of the individual processing element based on when a subsequent adjacent processing element in the forward path receives the incrementally delayed clock signal and terminating the reverse processing time interval of the individual processing element based on when a subsequent adjacent processing element in the reverse path receives the incrementally delayed clock signal such that one of the forward processing time interval or the reverse processing time interval is greater than the other.

2. The method of claim 1, wherein the incrementally delayed clock signal is separately provided to each of the plurality of serially connected processing elements.

3. The method of claim 1, wherein the subsequent adjacent processing element in the forward path comprises a next processing element in the array in the forward path.

4. The method of claim 3, wherein the individual processing element finishes processing a block of data along the forward path before the next processing element receives a clock trigger.

5. The method of claim 1, wherein the reverse processing time interval is terminated based on when a previous processing element in the array receives the incrementally delayed clock signal.

6. The method of claim 5, wherein the individual processing element finishes processing a block of data along the reverse path before the previous processing element receives a clock trigger.

7. The method of claim 1, wherein each of the plurality of processing elements uses a greater time interval for processing data in the forward path than in the reverse path.

8. The method of claim 7, wherein a clock cycle of the incrementally delayed clock signal is less than a longest time interval used by any of the plurality of processing elements for processing the data in the forward path.

9. An apparatus comprising:
a plurality of processing elements connected in a serial array, wherein the plurality of elements have a forward processing path and a reverse processing path; and
a clock signal distribution circuit in communication with the plurality of processing elements, the clock signal distribution circuit configured to provide a clock signal to the plurality of processing elements such that the clock signal arrives at successive processing elements with an incrementally increasing amount of delay,
wherein, in response to receiving the clock signal, individual processing elements are adapted to initiate a forward data processing interval in the forward processing path and a reverse data processing interval in the reverse processing path and to terminate the forward data processing interval and the reverse data processing interval based on when adjacent processing elements receive the clock signal such that one of the forward data processing interval or the reverse data processing interval is greater than the other.

10. The apparatus of claim 9, further comprising:
a forward clock driver that provides the clock signal along the forward processing path, wherein the clock signal has increasing delay along the forward processing path.

11. The apparatus of claim 9, further comprising:
a reverse clock driver that provides the clock signal along the reverse processing path, wherein the clock signal has increasing delay along the reverse processing path.

12. The apparatus of claim 9, wherein the clock signal distribution circuit is separately in communication with each of the plurality of serially connected processing elements and further comprising:
a clock switch configured to switch a direction of propagation of the clock signal.

13. The apparatus of claim 9, further comprising:
a data port configured to receive a stream of data blocks for processing by the plurality of processing elements, wherein the stream of data blocks comprises encryption data.

14. The apparatus of claim 13, further comprising:
a finite state machine configured to control the plurality of processing elements to process the stream of data blocks in accordance with a Montgomery's modular exponentiation algorithm.

15. An apparatus comprising:
a plurality of processing elements connected in a serial array, wherein
the plurality of processing elements have a forward processing path and a reverse processing path,
the processing elements have a forward processing time interval in the forward path that begins when a first block of data is gated into an individual processing element for processing into a first processed block of data and terminates when the first processed block of data is gated into a subsequent adjacent processing element along the forward processing path, and
the processing elements have a reverse processing time interval in the reverse path that begins when a second block of data is gated into the individual processing element for processing into a second processed block of data and terminates when the second processed block of data is gated into a subsequent adjacent processing element along the reverse processing path; and
a clock signal distribution circuit in communication with the plurality of processing elements, the clock signal distribution circuit configured to provide a clock signal to the plurality of processing elements such that the clock signal arrives at successive processing elements along the clock signal distribution circuit with an increasing amount of delay so that more than one full clock cycle elapses during the forward processing time interval and less than one full clock cycle elapses during the reverse processing time interval.

16. The apparatus of claim 15, wherein a duration of a smallest clock cycle in the clock signal is reduced to a period of time equal to an amount of time used by any of the plurality of processing elements in the forward processing path minus the amount of delay between processing elements in the forward processing path.

17. The apparatus of claim 15, further comprising:
a finite state machine configured to control the plurality of processing elements in accordance with a Montgomery's modular exponentiation algorithm to perform one or more encryption functions.

18. The apparatus of claim 15, wherein the plurality of processing elements perform a multiplication function on data in the forward processing path and an addition function on data in the reverse processing path.

19. The apparatus of claim 15, wherein the clock signal distribution circuit is separately in communication with each of the plurality of processing elements so that the clock signal is independently distributed to each processing element.

20. The apparatus of claim 19, wherein an amount of delay between any two adjacent processing elements is approximately the same and further comprising:
a switch configured to switch a direction of propagation of the clock signal.

* * * * *

UNITED STATES PATENT AND TRADEMARK OFFICE
CERTIFICATE OF CORRECTION

| | | |
|---|---|---|
| PATENT NO. | : 7,895,460 B2 | |
| APPLICATION NO. | : 12/885352 | |
| DATED | : February 22, 2011 | |
| INVENTOR(S) | : Thomas et al. | |

It is certified that error appears in the above-identified patent and that said Letters Patent is hereby corrected as shown below:

Title page, item (73), under "Assignee", in Column 1, Line 2, delete "Wilimington," and insert -- Wilmington, --.

Title page, item (56), under "Other Publications", in Column 2, Line 1, delete "Montogomery" and insert -- Montgomery --.

Page 2, item (56), under "Other Publications", in Column 2, Line 4, delete "Spinger-Verlag" and insert -- Springer-Verlag --.

Page 2, item (56), under "Other Publications", in Column 2, Line 27, delete "Arirthmetic," and insert -- Arithmetic, --.

Column 23, line 30, in Claim 15, delete "wherein" and insert -- wherein: --.

Signed and Sealed this
Twenty-eighth Day of June, 2011

David J. Kappos
*Director of the United States Patent and Trademark Office*